United States Patent
Nagahama et al.

(10) Patent No.: US 8,182,899 B2
(45) Date of Patent: May 22, 2012

(54) ANTI-GLARE FILM, METHOD OF MANUFACTURING THE SAME, AND DISPLAY APPARATUS USING THE SAME

(75) Inventors: Tsutomu Nagahama, Tokyo (JP); Yumi Haga, Tokyo (JP); Hitoshi Watanabe, Tokyo (JP); Shinichi Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 12/513,646

(22) PCT Filed: May 8, 2008

(86) PCT No.: PCT/JP2008/058892
§ 371 (c)(1),
(2), (4) Date: May 5, 2009

(87) PCT Pub. No.: WO2008/140108
PCT Pub. Date: Nov. 20, 2008

(65) Prior Publication Data
US 2010/0027124 A1  Feb. 4, 2010

(30) Foreign Application Priority Data
May 9, 2007  (JP) .................. 2007-124563

(51) Int. Cl.
*B32B 5/16* (2006.01)
(52) U.S. Cl. ............ 428/143; 359/601; 428/323
(58) Field of Classification Search .......... 428/141, 428/143–150, 156, 323–336, 338, 339; 359/599, 359/601
See application file for complete search history.

(56) References Cited

U.S. PATENT DOCUMENTS

| 525,731 | A | * | 9/1894 | Walther | 417/404 |
|---|---|---|---|---|---|
| 5,847,795 | A | * | 12/1998 | Satoh et al. | 349/137 |
| 6,164,785 | A | * | 12/2000 | Maekawa | 359/613 |
| 6,502,943 | B2 | * | 1/2003 | Nakamura et al. | 359/603 |
| 7,525,731 | B2 | * | 4/2009 | Aro et al. | 359/599 |
| 7,709,084 | B2 | * | 5/2010 | Saito et al. | 428/323 |

(Continued)

FOREIGN PATENT DOCUMENTS

JP  2005-316413  11/2005

(Continued)

OTHER PUBLICATIONS

European Search Report issued Mar. 9, 2011, corresponding to European Appln. No. 08752753.7.

(Continued)

*Primary Examiner* — Mark Consilvio
(74) *Attorney, Agent, or Firm* — K&L Gates LLP

(57) ABSTRACT

An anti-glare film is provided and includes a substrate and an anti-glare layer which is formed on the substrate and contains fine particles. The anti-glare layer has micro concave/convex shapes on the surface. The micro concave/convex shapes of the anti-glare layer are formed by coating the substrate with a coating material containing the fine particles and aggregating the fine particles by a convection of the coating material. A thickness of the anti-glare layer is equal to or larger than a mean diameter of the fine particles and is equal to or less than three times as large as the mean diameter of the fine particles. The fine particles are constructed substantially by fine particles having particle sizes less than twice as large as the thickness of the anti-glare layer.

7 Claims, 11 Drawing Sheets

U.S. PATENT DOCUMENTS

| | | | |
|---|---|---|---|
| 7,815,320 B2 * | 10/2010 | Ookubo et al. | 359/601 |
| 7,997,743 B2 * | 8/2011 | Suzuki et al. | 359/601 |
| 8,003,194 B2 * | 8/2011 | Richter et al. | 428/147 |
| 2005/0255291 A1 | 11/2005 | Iwata et al. | |
| 2006/0132922 A1 | 6/2006 | Takao et al. | |
| 2006/0153979 A1 * | 7/2006 | Asakura et al. | 427/164 |
| 2007/0253064 A1 * | 11/2007 | Ookubo et al. | 359/599 |
| 2008/0213513 A1 * | 9/2008 | Kameshima et al. | 428/1.32 |
| 2008/0241508 A1 * | 10/2008 | Kuwabara et al. | 428/323 |
| 2008/0260997 A1 * | 10/2008 | Iwata et al. | 428/141 |
| 2008/0286527 A1 * | 11/2008 | Haga et al. | 428/143 |
| 2009/0067190 A1 * | 3/2009 | Funabashi et al. | 362/558 |
| 2009/0310219 A1 * | 12/2009 | Nagahama et al. | 359/493 |

FOREIGN PATENT DOCUMENTS

| | | |
|---|---|---|
| JP | 2005-316450 | 11/2005 |
| JP | 2006-106224 | 4/2006 |
| JP | 2007-041533 | 2/2007 |
| JP | 2007-108724 | 4/2007 |
| WO | 2006/088203 A1 | 8/2006 |

OTHER PUBLICATIONS

International Search Report dated Aug. 12, 2008, for corresponding International Application No. PCT/JP2008/058892.

International Preliminary Report on Patentability (PCT/IB/338 dated Jan. 2004) issued on Nov. 24, 2009; 5 pages.

* cited by examiner

ANTI-GLARE FILM, METHOD OF MANUFACTURING THE SAME, AND DISPLAY APPARATUS USING THE SAME

CROSS REFERENCE TO RELATED APPLICATIONS

The present application is a National Stage of International Application No. PCT/JP2008/058892 filed on May 8, 2008 and which claims priority to Japanese Patent Application No. 2007-124563 filed on May 9, 2007, the entire contents of which are being incorporated herein by reference.

BACKGROUND

Hitherto, in various display apparatuses such as a liquid crystal display, a plasma display, and a CRT display, if external light of a fluorescent lamp or the like is reflected onto the surface, visibility is remarkably deteriorated. Therefore, there is used a method whereby a reflectance is decreased by forming an optical multilayer film or a film of a low refractive index onto the surface of the display apparatus or the external light is diffused and reflected by forming an anti-glare film having micro concave/convex portions on the surface, thereby blurring a reflected image.

However, there is such a problem that if the optical multilayer film is used, manufacturing costs increase, an anti-glare property is insufficient, and even if the manufacturing costs are suppressed by using the low refractive index film, the reflectance is relatively high, so that the user is conscious of the reflected image.

On the other hand, the method whereby the anti-glare film having the micro concave/convex portions on the surface is used and the reflected image is blurred by the diffuse reflection is widely used because it is reasonable and high productivity is obtained.

A construction of a conventional anti-glare film 101 is shown in FIG. 10. The anti-glare film 101 has: a substrate 111; and an anti-glare layer 112 formed on the substrate 111. The anti-glare layer 112 is formed by a resin containing fine particles 113 made of irregular silica or resin beads. By projecting the fine particles 113 from the surface of the anti-glare layer 112, micro concave/convex shapes are formed on the surface. The anti-glare film 101 is formed by coating the substrate 111 with a coating material containing the fine particles 113, a resin, a solvent, and the like and drying the coating material. According to the anti-glare film 101 having the construction mentioned above, since light which enters the anti-glare layer 112 is scattered by the fine particles 113 projected from the anti-glare layer 112, a reflected image due to the surface reflection is blurred.

According to the anti-glare film 101, however, although the anti-glare property is obtained, since the concave/convex portions are formed on the surface by the projecting shape of each fine particle 113, there is such a problem that a haze value rises due to the projections of those fine particles 113, an image becomes whitish, and particularly, in the case where the external light is strong, a contrast decreases, visibility deteriorates, and image visibility also deteriorates.

Therefore, as shown in FIG. 11, such a technique that a filling rate of the fine particles 113 in the anti-glare layer 112 is reduced and a cycle of the concave/convex portions on the surface of the anti-glare layer 112 is extended, thereby raising the contrast has been proposed. However, if it is intended to realize the smooth concave/convex shapes by extending the cycle or the concave/convex portions on the surface of the anti-glare layer 112 as mentioned above, flat portions are formed between the projections of the fine particles 113, so that the anti-glare property deteriorates.

Therefore, in recent years, a surface treatment in which an appearance of white muddiness is suppressed and the contrast is high while the anti-glare property is held has been demanded and various methods of realizing such a surface treatment have been being examined. For example, an anti-glare film in which by controlling a mean diameter of fine particles, an average slope angle which is formed by the fine particles, and display contrast characteristics, a deterioration in contrast is suppressed while maintaining an anti-glare property has been disclosed in JP-A-2007-41533.

However, since there is a contradictory relation between both characteristics of the anti-glare property and the contrast, it is difficult to design an anti-glare film which can satisfy them and it is demanded to further improve both of those characteristics. For example, as disclosed in JP-A-2007-415533 mentioned above, it has been known that when the mean diameter of the fine particles, the average slope angle, and the display contrast characteristics are merely controlled, it is difficult to obtain the sufficient anti-glare property and contrast.

SUMMARY

The present disclosure relates to an anti-glare film, a method of manufacturing the same, and a display apparatus using the same. More particularly, the present disclosure relates to an anti-glare film which is used for surfaces of various display apparatuses such as a liquid crystal display, a plasma display, a rear projection type display, an electroluminescence display, and a CRT (Cathode Ray Tube) display and relates to a method of manufacturing the same and a display apparatus using the same.

It is an object of the invention to provide an anti-glare film which can satisfy both anti-glare property and a contrast and to provide a method of manufacturing the same and a display apparatus using the same.

It has been determined that instead of the light scattering due to the projection of each fine particle projecting from the surface of an anti-glare layer, a Marangoni convection due to uneven distribution (surface tension variation) of the surface tension which is generated at the time of volatilization of a solvent contained in a coating material is used, the fine particles are properly aggregated by the convection which is caused in the coating material, a Benard cell structure is formed on the surface, and gentle wavy micro concave/convex shapes are formed onto the anti-glare layer surface by meniscuses of the liquid resin formed in the Benard cells, so that an anti-glare film which can satisfy both an anti-glare property and a contrast can be obtained.

It has also been found out that in order to form the gentle wavy concave/convex shapes which can satisfy both of the anti-glare property and the contrast as mentioned above, it is extremely important to continuously form ridge line portions between fine particle aggregates which are formed by the convection of the coating material containing the fine particles, solvent, and resin and it is preferable to use fine particles having relatively wide particle size distribution.

However, according to the anti-glare film containing the fine particles having the relatively wide particle size distribution, since the fine particles of large diameters projecting largely from the anti-glare layer surface exist and, further, their existence frequency is small, there occurs such a problem that the large-sized particles are visually perceived like a foreign matter defect (matter defect) on the anti-glare layer surface and, particularly, when the external light is reflected onto the surface, the film surface is seen like a rough surface.

It has been determined that an anti-glare film in which by controlling the particle size distribution of the fine particles, an existence probability of the large-sized particles, and a film thickness of the anti-glare layer, the rough surface defect due to the large-sized particles is reduced while satisfying both of the anti-glare property and the contrast.

According to first embodiment, there is provided an anti-glare film comprising:
  a substrate; and
  an anti-glare layer which is formed on the substrate and contains fine particles,
  wherein the anti-glare layer has micro concave/convex shapes on its surface,
  the micro concave/convex shapes of the anti-glare layer are formed by coating the substrate with a coating material containing the fine particles and aggregating the fine particles by a convection of the coating material,
  a thickness of the anti-glare layer is equal to or larger than a mean diameter of the fine particles and is equal to or less than three times as large as the mean diameter of the fine particles, and
  the fine particles are constructed substantially by fine particles having particle sizes less than twice as large as the thickness of the anti-glare layer.

According to a second embodiment, there is provided a method of manufacturing an anti-glare film, comprising:
  classifying and removing fine particles;
  coating a substrate with a coating material containing at least the fine particles obtained after the classification and removal, a resin, and a solvent;
  drying the coating material coated onto the substrate and forming Benard cells onto the surface of the coating material which has been coated; and
  curing the resin contained in the coating material formed with the Benard cells, thereby forming a layer having micro concave/convex shapes on its surface,
  wherein the layer having the micro concave/convex shapes has a thickness which is equal to or larger than a mean diameter of the fine particles and is equal to or less than three times as large as the mean diameter of the fine particles, and
  the fine particles obtained after the classification and removal are constructed substantially by fine particles having particle sizes less than twice as large as the thickness of the layer having the micro concave/convex shapes on its surface.

According to a third embodiment, there is provided a display apparatus comprising:
  a display unit for displaying an image; and
  an anti-glare film formed on a display surface side of the display unit,
  wherein the anti-glare film has
  a substrate and
  an anti-glare layer which is formed on the substrate and contains fine particles,
  the anti-glare layer has micro concave/convex shapes on its surface,
  the micro concave/convex shapes of the anti-glare layer are formed by coating the substrate with a coating material containing the fine particles and aggregating the fine particles by a convection of the coating material,
  a thickness of the anti-glare layer is equal to or larger than a mean diameter of the fine particles and is equal to or less than three times as large as the mean diameter of the fine particles, and
  the fine particles are constructed substantially by fine particles having particle sizes less than twice as large as the thickness of the anti-glare layer.

According to a fourth embodiment, there is provided an anti-glare film comprising:
  a substrate, and
  an anti-glare layer which is formed on the substrate and contains fine particles,
  wherein the anti-glare layer has micro concave/convex shapes on its surface,
  the micro concave/convex shapes of the anti-glare layer are formed by coating the substrate with a coating material containing the fine particles and aggregating the fine particles by a convection of the coating material,
  a thickness of the anti-glare layer is equal to or larger than a mean diameter of the fine particles and is equal to or less than three times as large as the mean diameter of the fine particles, and
  the fine particles are constructed substantially by fine particles having particle sizes less than twice as large as the mean diameter.

According to a fifth embodiment, there is provided a method of manufacturing an anti-glare film, comprising:
  classifying and removing fine particles;
  coating a substrate with a coating material containing at least the fine particles obtained after the classification and removal, a resin, and a solvent;
  drying the coating material coated onto the substrate and forming Benard cells onto the surface of the coating material which has been coated; and
  curing the resin contained in the coating material formed with the Benard cells, thereby forming a layer having micro concave/convex shapes on its surface,
  wherein the layer having the micro concave/convex shapes has a thickness which is equal to or larger than a mean diameter of the fine particles and is equal to or less than three times as large as the mean diameter of the fine particles, and
  the fine particles obtained after the classification and removal are constructed substantially by fine particles having particle sizes less than twice as large as the mean diameter.

According to a sixth embodiment, there is provided a display apparatus comprising:
  a display unit for displaying an image; and
  an anti-glare film formed on a display surface side of the display unit,
  wherein the anti-glare film has
  a substrate and
  an anti-glare layer which is formed on the substrate and contains fine particles,
  the anti-glare layer has micro concave/convex shapes on its surface,
  the micro concave/convex shapes of the anti-glare layer are formed by coating the substrate with a coating material containing the fine particles and aggregating the fine particles by a convection of the coating material,
  a thickness of the anti-glare layer is equal to or larger than a mean diameter of the fine particles and is equal to or less than three times as large as the mean diameter of the fine particles, and
  the fine particles are constructed substantially by fine particles having particle sizes less than twice as large as the mean diameter.

According to a seventh embodiment, there is provided an anti-glare film comprising:

a substrate; and an anti-glare layer which is formed on the substrate and contains fine particles, wherein the anti-glare layer has micro concave/convex shapes on its surface, the micro concave/convex shapes of the anti-glare layer are formed by coating the substrate with a coating material containing the fine particles and aggregating the fine particles by a convection of the coating material, a thickness of the anti-glare layer is equal to or larger than a mean diameter of the fine particles and is equal to or less than three times as large as the mean diameter of the fine particles, and the mean diameter of the fine particles is less than a medium particle size.

According to an eighth embodiment, there is provided a method of manufacturing an anti-glare film, comprising the steps of:

classifying and removing fine particles;

coating a substrate with a coating material containing at least the fine particles obtained after the classification and removal, a resin, and a solvent;

drying the coating material coated onto the substrate and forming Benard cells onto the surface of the coating material which has been coated; and curing the resin contained in the coating material formed with the Benard cells, thereby forming a layer having micro concave/convex shapes on its surface, wherein the layer having the micro concave/convex shapes has a thickness which is equal to or larger than a mean diameter of the fine particles and is equal to or less than three times as large as the mean diameter of the fine particles, and the mean diameter of the fine particles is less than a medium particle size.

According to a ninth embodiment, there is provided a display apparatus comprising:

a display unit for displaying an image; and an anti-glare film formed on a display surface side of the display unit, wherein the anti-glare layer has micro concave/convex shapes on its surface, the micro concave/convex shapes of the anti-glare layer are formed by coating the substrate with a coating material containing the fine particles and aggregating the fine particles by a convection of the coating material, a thickness of the anti-glare layer is equal to or larger than a mean diameter of the fine particles and is equal to or less than three times as large as the mean diameter of the fine particles, and the mean diameter of the fine particles is less than a medium particle size.

According to the embodiment, by forming the continuous gentle wavy micro concave/convex shapes onto the anti-glare layer surface by using the fine particles having wide particle size distribution, the appearance of white muddiness can be suppressed while dispersing the light.

According to the embodiment, by controlling the existence probability of the large-sized particles among the fine particles contained in the anti-glare layer and the film thickness of the anti-glare layer, the projection of the large-sized particles from the anti-glare layer surface can be reduced.

According to the embodiment, by forming the continuous gentle wavy micro concave/convex shapes onto the anti-glare layer surface by using the fine particles having wide particle size distribution, the anti-glare film having the excellent contrast while having the anti-glare property can be obtained. By controlling the existence probability of the large-sized particles among the fine particles contained in the anti-glare layer and the film thickness of the anti-glare layer, the large-sized particles are not visually perceived as matter defects on the anti-glare layer surface and the rough surface appearance can be improved. Therefore, the display apparatus using such an anti-glare film can realize the excellent visibility.

Additional features and advantages are described herein, and will be apparent from, the following Detailed Description and the figures.

DETAILED DESCRIPTION

Figure 1:
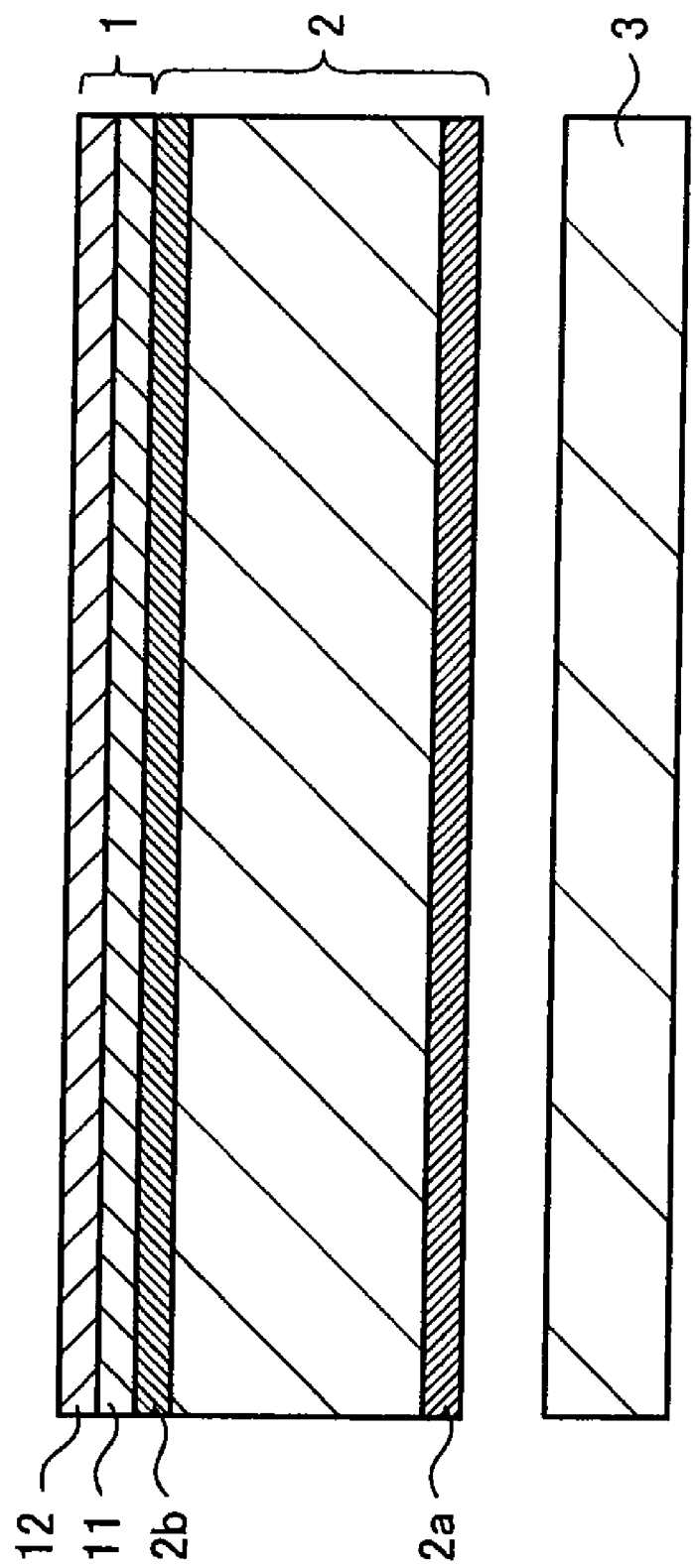
FIG. 1 is a schematic cross sectional view showing an example of a construction of a liquid crystal display apparatus according to the first embodiment.

Embodiments will be described hereinbelow with reference to the drawings. In all of the following embodiments, the same or corresponding portions are designated by the same reference numerals.

(1) First Embodiment
(1-1) Construction of Liquid Crystal Display Apparatus

FIG. 1 shows an example of a construction of a liquid crystal display apparatus according to the first embodiment. As shown in FIG. 1, the liquid crystal display apparatus has a liquid crystal panel 2 and a light source 3 provided just under the liquid crystal panel 2. The liquid crystal panel 2 has an anti-glare film 1 on its display screen side.

The light source 3 is used to supply light to a liquid crystal panel 4 and has, for example, a fluorescent lamp (FL), an EL (Electro Luminescence), an LED (Light Emitting Diode), or the like. The liquid crystal panel 2 is used to time-dependently and spatially modulate the light supplied from the light source 3 and display information. Polarizer sheets 2a and 2b are provided on both surfaces of the liquid crystal panel 2. Each of the polarizer sheets 2a and 2b allows only one of the polarization components which cross perpendicularly in the incident light to pass and shields the other polarization component by absorption. The polarizer sheets 2a and 2b are arranged so that, for example, transmission axes cross mutually perpendicularly.

(1-2) Construction of Anti-Glare Film

Figure 2:
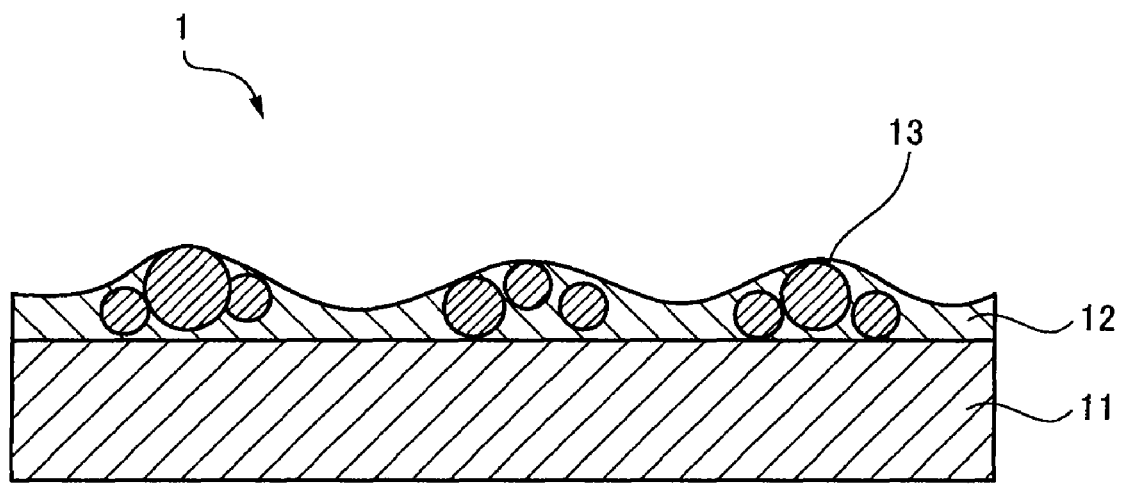
FIG. 2 is a schematic cross sectional view showing an example of a construction of an anti-glare film according to the first embodiment.

FIG. 2 shows an example of a construction of the anti-glare film 1 according to the first embodiment of the invention. As shown in FIG. 2, the anti-glare film 1 has: a substrate 11, and an anti-glare layer 12 formed on the substrate 11. The anti-glare layer 12 contains fine particles 13. Benard cells are formed on the surface of the anti-glare layer 12 by a convection which is caused in a coating material in a drying step of the coating material and micro concave/convex shapes formed by a proper aggregation or the like of the fine particles 13 are formed on the surface.

An outer haze is preferably equal to or less than 5% and, much preferably, is equal to or less than 3%. If the outer haze is equal to or less than 5%, an appearance of white muddiness decreases. If it is equal to or less than 3%, the appearance of white muddiness is hardly perceived. The outer haze indicates a value at the time when the surface scattering is detected. The higher the outer haze is, the more the white muddiness increases.

The degree of white muddiness is preferably equal to or less than 2.0, much preferably, lies within a range from 0.5 to 1.5. If the degree of white muddiness is equal to or less than 2.0, a decrease in contrast can be suppressed. If it is equal to or less than 1.5, the excellent contrast can be realized.

(Substrate)

As a material of the substrate 11, for example, a plastic film having transparency can be used. As a transparent plastic film, for example, a well-known high polymer film can be used. As a well-known high polymer film, specifically speaking, for example, triacetyl cellulose (TAC), polyester (TPEE), polyethylene terephthalate (PET), polyimide (PI), polyamide (PA), aramid, polyethylene (PE), polyacrylate (PAR), polyether sulfone, polysulfone, diacetyl cellulose, polypropylene (PP), polyvinyl chloride, an acrylic resin (PMMA), polycarbonate (PC), an epoxy resin, a urea resin, an urethane resin, a melamine resin, or the like can be mentioned. Some of those well-known high polymer films can be properly selected and used. Although a thickness of substrate II preferably lies within a range from 38 µm to 100 µm from a viewpoint of productivity, it is not particularly limited to such a range.

(Anti-Glare Layer)

An average film thickness of anti-glare layer 12 preferably lies within a range from 3 to 30 µm; much preferably, a range from 4 to 15 µm. This is because if the film thickness is less than 3 µm, it is difficult to obtain a desired hardness, and if it is larger than 30 µm, there is a case where the resin is curled in the step of curing the resin upon manufacturing. The film thickness of anti-glare layer 12 is adjusted in accordance with the mean diameter of the fine particles 13 which are used. The film thickness is preferably equal to or larger than the mean diameter of the fine particles 13 and is equal to or less than three times as large as the mean diameter of the fine particles 13, much preferably, is equal to or larger than 1.5 times as large as the mean diameter and is equal to or less than three times as large as the mean diameter of the fine particles 13. If the film thickness is less than the mean diameter of the fine particles 13, there is such a tendency that the degree of white muddiness rises and the matter defect occurs on the surface. If the film thickness exceeds three times as large as the mean diameter of the fine particles 13, there is a case where the resin is curled during the step of curing the resin upon manufacturing.

In the embodiment, the film thickness of anti-glare layer 12 denotes the average film thickness of the anti-glare layer 12.

The film thickness of anti-glare layer 12 can be obtained by observing a cross section obtained by cutting the anti-glare film 1 by an SEM (scanning electron microscope) and measuring a thickness of binder portion of the anti-glare layer 12. On the other hand, since the thickness obtained by a method of subtracting an arithmetic mean roughness Ra of the anti-glare layer 12 from the thickness of the whole anti-glare layer 12 containing the fine particles 13 which has been measured by using a Thickness Measuring Instrument (manufactured by TESA Co., Ltd.) almost coincides with the thickness of binder portion which has been measured by the SEM observation, such a method may be used.

In the embodiment, the numerical value range of the film thickness of anti-glare layer 12 has been obtained by the latter measuring method in the foregoing measuring methods.

The micro concave/convex shapes are formed on the surface of the anti-glare layer 12. The micro concave/convex shapes differ from the concave/convex shapes formed when each fine particle 13 is projected from the anti-glare layer 12 as in the conventional manner and it is preferable to form the micro concave/convex shapes on the surface of the anti-glare layer 12, for example, by setting an aggregate of the fine particles 13 in which the fine particles 13 have properly been aggregated in the in-plane direction to one convex portion. Thus, the surface of the anti-glare layer 12 becomes the gentle micro concave/convex shapes of a long cycle and both of the contrast and the anti-glare property can be satisfied.

It is also preferable that the fine particles 13 are not extremely projected from the anti-glare layer 12 and the surfaces of the fine particles 13 are not extremely exposed. This is because if the surfaces of the fine particles 13 are extremely exposed, the micro concave/convex shapes containing steep angle components are formed by steep inclined portions of the fine particles 13 and the light is diffused at a wide angle, so that the display screen becomes a white muddiness. Much preferably, it is preferable that the surfaces of the fine particles 13 are not exposed. By suppressing the exposure of the fine particles 13, the micro concave/convex shapes containing the steep angle component are not formed. Therefore, the wide-angle scattering decreases and the white muddiness can be further suppressed.

As a fine particle 13, for example, a spherical or flat inorganic fine particle or organic fine particle or the like is used. The mean diameter of fine particles 13 preferably lies within a range from about 5 nm to about 15 µm, much preferably, a range from 1 µm to 10 µm, and further preferably, a range from 1.5 µm to 7.5 µm. This is because if the mean diameter is less than 5 nm, the surface roughness of the anti-glare layer 12 becomes too fine and the anti-glare property is poor, and if it is larger than 15 µm, the film thickness of anti-glare layer 12 becomes thick, so that there is a case where the resin is curled in the step of curing the resin upon manufacturing. The mean diameter of the fine particles 13 can be measured by, for example, a dynamic light scattering method, a laser diffracting method, a centrifugal sedimentation method, an FFF (Field Flow Fractionation) method, a pore electric resistance method, or the like.

In the embodiment, the numerical value range of the mean diameter of the fine particles 13 has been obtained by the pore electric resistance method in the foregoing measuring methods.

As organic fine particles, for example, the fine particle made of an acrylic resin (PMMA), styrene (PS), an acryl-styrene copolymer, a melamine resin, polycarbonate (PC), or the like can be used. The organic fine particle is not particularly limited to a cross-link, an uncross-link, or the like but any organic fine particle made of plastics or the like can be used. In order to properly cause a convection which occurs in the coating material upon manufacturing and an aggregation of the fine particles 13 and to form desired micro concave/convex shapes onto the surface of the anti-glare layer 12, it is preferable to use beads of a low polarity. In more detail, in the case where the fine particles 13 having a small polarity such as, for example, an acrylic resin or the like are used as fine particles 13, the convection in the coating material which occurs upon manufacturing and the aggregation of the fine particles 13 decrease slightly. Therefore, it is much preferable to use the non-polar fine particles 13 such as, for example, styrene or the like. The fine particles 13 whose polarity has been adjusted like an acryl-styrene copolymer may be used. This is because the anti-glare property of the anti-glare layer 11 can be further improved by such fine particles.

As inorganic fine particles, for example, regular silica, alumina, or the like can be used. It is preferable to make the surfaces of the inorganic fine particles non-polar by an organic process. This is because the convection and the aggregation of the fine particles 13 occur properly and desired Benard cells are formed.

By using the fine particles 13 having wide particle size distribution as such fine particles 13, the continuous gentle wavy micro concave/convex shapes can be formed onto the surface of the anti-glare layer 12, so that a degree of white muddiness can be reduced while maintaining the anti-glare property. This is because ridge line portions between the convex portions which are formed by the proper aggregation of the fine particles 13 can be continuously formed. Particularly, in order to form the gentle wavy shape, it is preferable to set a fluctuation coefficient (standard deviation/mean diameter) of the particle size distribution to 25 to 40%. This is because if it is less than 25%, a flat portion is liable to be formed between the convex portions and the anti-glare property is poor. On the contrary, if it is larger than 40%, the number of large-sized particles to be removed by a classifying process, which will be described hereinafter, increases. Therefore, it is undesirable from a viewpoint of costs. The fluctuation coefficient of the particle size distribution indicates a value of the fluctuation coefficient of the particle size distribution of the fine particles 13 obtained after the classifying process was executed.

There is such a problem that in the case of using the fine particles 13 of the wide particle size distribution as mentioned above, a small number of large-sized particles which are contained are projected from the anti-glare layer 12, large projection defects are formed, the large projection defects are visually perceived as matter defects, and a rough surface appearance is perceived on the surface. It is, therefore, necessary to cut the large-sized particles in order to eliminate the projection defects formed by the large-sized particles. Particularly, in the case of using the fine particles 13 having the wide particle size distribution in which the fluctuation coefficient of the particle size distribution is equal to 25 to 40%, a large number of fine particles having relatively large particle sizes are contained. Therefore, the classifying process becomes very important.

If the fluctuation coefficient of the particle size distribution is small and a difference between the mean diameter of the fine particles 13 and the particle sizes of the large-sized particles to be cut by the classifying process is large, the large-sized particles can be classified and removed by using a filter. However, if such a difference is small, the number of large-sized particles which are choked to the filter increases and a choke occurs, so that distribution itself of the small-sized particles also changes. It is, therefore, necessary to select the method of the classifying process and the number of times thereof in accordance with desired classification precision. As a specific method of the classifying process, for example, there can be mentioned a gravity classifier, an inertia classifier, a centrifugal classifier, a cyclone, an air separator, a micron separator, Microplex, Multiplex, a zigzag classifier, Accucut, a conical separator, a turbo classifier, a super separator, a dispersion separator, Elbow-Jet, a fluidized bed classifier, a virtual impactor, O-Sepa, a vibrating screen, a shifter ("Handbook of powder engineering" edited by The Society of Powder Technology, The Nikkan Kogyo Simbun Ltd., p 514 (1986)), and the like.

The particle sizes which are classified differ depending on the film thickness of anti-glare film 1 and a target surface roughness shape. To reduce the matter defects caused by the large-sized particles on the surface of the anti-glare layer 12, since a relation between the particle sizes of the fine particles 13 and the thickness of anti-glare layer 12 is important, it is necessary to properly control such a relation. Therefore, the large-sized particles which are equal to or larger than twice as large as the thickness of anti-glare layer 12 are classified and removed, thereby deriving the fine particles 13 in which the fine particles 13 having the particle sizes which are equal to or larger than twice as large as the thickness of anti-glare layer 12 are not substantially contained, much preferably, deriving the fine particles 13 in which the fine particles 13 having the particle sizes which are equal to or larger than 1.6 times as large as the thickness of anti-glare layer 12 are not substantially contained. Thus, the matter defects are reduced and the anti-glare film 1 having the smooth surface can be obtained.

That is, as fine particles 13, by using the fine particles substantially containing the fine particles 13 having the particle sizes less than twice as large as the thickness of anti-glare layer 12, much preferably, the fine particles substantially containing the fine particles 13 having the particle sizes less than 1.6 times as large as the thickness of anti-glare layer 12, the matter defects are reduced and the anti-glare film 1 having the smooth surface can be obtained.

The wording "the large-sized particles are not substantially contained" denotes not only a case where the large-sized particles are not contained at all but also a case where a small number of large-sized particles are contained to such a certain extent that quality is not deteriorated within a range where the a rough surface appearance is not particularly perceived on the surface of the anti-glare layer 12 due to the matter defects which are formed by the large-sized particles. It is preferable to set a ratio of the large-sized particles to, for example, 0.1% or less in the fine particles 13.

In the fine particles 13, by setting the number of fine particles having the particle sizes which are equal to or larger than twice as large as the mean diameter to 2% or less, much preferably, 1% or less, and further preferably, 0.5% or less and by setting the thickness of anti-glare layer 12 to a value which is equal to or larger than the mean diameter, much preferably, a value which is equal to or larger than 1.5 times as large as the mean diameter, the matter defects are reduced and the anti-glare film 1 having the smooth surface can be obtained.

That is, as fine particles 13, the fine particles substantially containing the fine particles having the particle sizes less than twice as large as the mean diameter are used and the thickness of anti-glare layer 12 is set to a value which is equal to or larger than the mean diameter, much preferably, a value which is equal to or larger than 1.5 times as large as the mean diameter. Specifically speaking, as fine particles 13, at a ratio of the number of fine particles having the particle sizes less than twice as large as the mean diameter, the fine particles over 98%, much preferably, over 99%, further preferably, over 99.5% are substantially contained, and the thickness of anti-glare layer 12 is set to a value which is equal to or larger than the mean diameter, much preferably, a value which is equal to or larger than 1.5 times as large as the mean diameter. By setting as mentioned above, the matter defects are reduced and the anti-glare film 1 having the smooth surface can be obtained.

Similarly, by classifying and removing the large-sized particles until the mean diameter of the fine particles 13 becomes smaller than a medium particle size and by setting the thickness of anti-glare layer 12 to a value which is equal to or larger than the mean diameter, much preferably, a value which is equal to or larger than 1.5 times as large as the mean diameter, the anti-glare film 1 in which the matters are not visually perceived and which has the smooth surface can be obtained.

In the embodiment, the medium particle size denotes a particle size at the time when the number of or a mass of fine particles larger than a certain particle size occupies 50% of that of the whole powder in particle size distribution of the powder.

Figure 3:
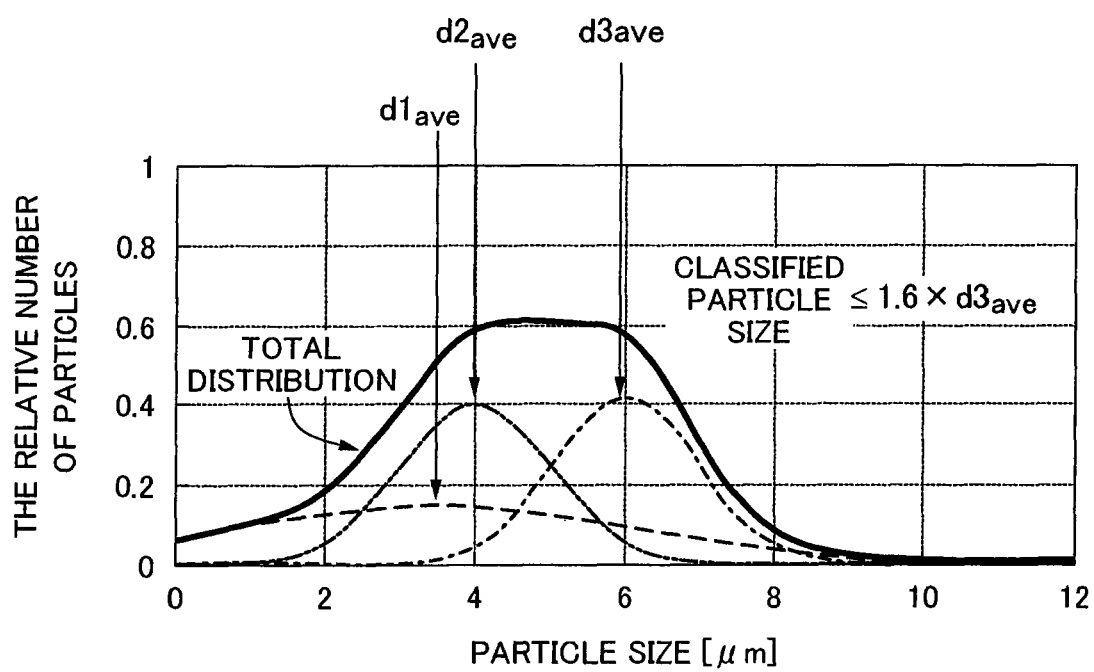
FIG. 3 is a diagram showing particle size distribution of fine particles in the case where the fine particles of different particle size distribution are combined.

Further, in order to suppress a manufacturing variation, it is preferable to construct in such a manner that even if the film thickness of anti-glare layer 12 fluctuates slightly, the roughness of the surface of the anti-glare layer 12 is not largely changed. It is, therefore, preferable to use the fine particles 13 in which two or more kinds of fine particles having different particle size distribution are combined in the wide particle size distribution. This is because, according to such fine particles 13 in which a plurality of fine particles are combined, a flat region can be provided for a peak of the particle size distribution. FIG. 3 is a diagram showing particle size distribution of fine particles d1, fine particles d2, and fine particles d3 each having different particle size distribution and their total distribution. In the example shown in FIG. 3, by combining the first fine particles whose mean diameter is equal to d$1_{ave}$, the second fine particles whose mean diameter is equal to d$2_{ave}$, and the third fine particles whose mean diameter is equal to d$3_{ave}$, a peak of their total distribution can be flattened.

In such a case, by executing the classification removal so that the fine particles having the particle sizes which are equal to or larger than 1.6 times as large as the mean diameter of the fine particles 13 whose mean diameter is largest are not substantially contained and by setting the thickness of anti-glare layer 12 to a value which is equal to or larger than 0.8 time as large as the fine particles 13 whose mean diameter is largest and which is equal to or less than 3 times as large as the mean diameter of the fine particles whose mean diameter is largest, the anti-glare film 1 having the smooth surface in which there are no matters can be obtained.

The anti-glare film 1 according to the first embodiment does not have the local projections of the fine particles 13 but has the continuous gentle wavy micro concave/convex shapes on the surface of the anti-glare layer 12. Therefore, the anti-glare film 1 in which while maintaining the anti-glare property, a phenomenon in which the light is diffused at a wide angle is suppressed, a phenomenon in which the display screen becomes a white muddiness can be reduced, and a rough surface appearance due to the matter defects is small can be realized.

(1-2) Manufacturing Method of Anti-Glare Film

Subsequently, an example of a manufacturing method of the anti-glare film 1 having the foregoing construction will be described. According to the manufacturing method of the anti-glare film 1, the substrate 11 is coated with a coating material containing the fine particles 13, a resin, and a solvent, the fine particles 13 are properly aggregated in the in-plane direction by a convection which occurs in the step of drying the solvent, Benard cells are formed on the surface of the coating film, and thereafter, they are cured.

(Adjustment of Coating Material)

First, for example, the resin, the foregoing fine particles 13, and the solvent are mixed by a stirrer such as a disper or the like or a disperser such as a beads mill or the like, thereby obtaining the coating material in which the fine particles 13 have been dispersed. In this instance, a light stabilizer, an ultraviolet absorbent, an antistatic agent, a flame resistance, an oxidation inhibitor, or the like may be further added as necessary. Silica fine particles or the like may be further added as a viscosity adjuster.

As a solvent, for example, an organic solvent which dissolves a resin raw material that is used, has good wettability with the fine particles 13, and does not bleach the substrate 11 or the like can be used. It is preferable to use the solvent whose surface tension is equal to or less than 23 mN/m at a coating temperature. This is because the Benard cells can be moderately formed at the time of drying the coating material and the gentle waviness can be obtained on the surface of the anti-glare layer 12. If the surface tension exceeds the above range, the aggregation of the fine particles 13 becomes hard and the concave/convex portions which are formed on the surface of the anti-glare layer 12 enlarge. Therefore, although the excellent anti-glare property can be derived, the surface becomes a white muddiness and the surface becomes glossy. As such an organic solvent, for example, tertiary butanol whose surface tension is equal to 20.0 mN/m at an environmental temperature of 20° C., isopropyl acetate of 22.1 mN/m under an environmental condition of 22° C., or the like can be mentioned. However, the embodiment is not particularly limited to those materials so long as the above requirements are satisfied.

The surface tension of the solvent can be calculated by, for example, a wilhelmy method whereby a wilhelmy sheet and a liquid sample are come into contact with each other, a distortion is applied, and a force adapted to pull the wilhelmy sheet into the liquid is measured. As a measuring apparatus, for example, RHEOSURF as a dynamic surface tension measuring apparatus manufactured by UBM Co., Ltd. can be used.

As a resin, for example, an ionizing radiation curing type resin which is cured by an ultraviolet ray or an electron beam or a thermosetting resin which is cured by heat is preferable from a viewpoint of easiness of manufacturing, and a photosensitive resin which can be cured by an ultraviolet ray is most preferable. As such a photosensitive resin, for example, an acrylate system resin such as urethane acrylate, epoxy acrylate, polyester acrylate, polyol acrylate, polyether acrylate, or melamine acrylate can be used. As characteristics after the curing, a photosensitive resin having an excellent translucent property is particularly preferable from a viewpoint of an image permeability, a photosensitive resin having a high hardness is preferable from a viewpoint of a damage resistance, and one of them can be properly selected. The ionizing radiation curing type resin is not particularly limited to an ultraviolet curing type resin. Although any resin can be used so long as it has the translucent property, a resin in which a hue of the transmitted light and a transmitted light amount are not remarkably changed by coloring and haze is preferable.

Such a photosensitive resin is obtained by mixing a photopolymerization initiator into an organic material such as monomer, oligomer, or polymer which can form the resin. For example, the urethane acrylate resin is obtained by allowing an isocyanate monomer or prepolymer to react to polyester polyol and by allowing a monomer of an acrylate or methacrylate system having a hydroxyl group to react to an obtained product.

In the first embodiment, as a monomer, oligomer, and polymer which can form the resin, it is preferable to use at least one kind of monomer, oligomer, and polymer which are liquids even if they are dried. As a monomer, oligomer, and polymer which are liquids even if they are dried, it is preferable to use a material having a nature of a relatively high viscosity in which even after it was dried, a Benard cell structure is maintained on the surface of the coating material and meniscuses due to the resin liquid can be formed in the Benard cells. This is because even after the coating film was dried, the gentle concave/convex shapes can be held on the surface.

As a photopolymerization initiator contained in the photosensitive resin, for example, a benzophenone derivative, an acetophenone derivative, an anthraquinone derivative, or the like can be used solely or in combination. A component which enables a coating film to be more preferably formed, for example, an acrylic resin or the like may be further properly selectively mixed into the photosensitive resin.
(Coating)

Subsequently, the substrate 11 is coated with the coating material obtained as mentioned above. It is coated with the coating material so that an average film thickness after the drying is equal to, preferably, 3 to 30 µm, much preferably, 4 to 15 µm. The film thickness is properly adjusted in accordance with the particle size of the fine particles 13. There is a case where when the film thickness is smaller than such a numerical value range, it is difficult to obtain a desired hardness, and when the film thickness is larger than such a numerical value range, the resin is largely curled at the time of curing of the resin. The coating method is not particularly limited but a well-known coating method can be used. As a well-known coating method, for example, a gravure coater, a bar coater, a die coater, a knife coater, a comma coater, a spray coater, a curtain coater, or the like can be mentioned. The coating method is not limited to them but any method may be used so long as a thickness of a predetermined amount can be uniformly coated.
(Drying and Forming of Benard Cells)

After the coating of the coating material, by drying, the solvent is volatilized. In the first embodiment of the invention, a Marangoni convection due to uneven distribution of the surface tension occurring at the time of volatilization of the solvent is used, a collision and an aggregation of the fine particles 13 are properly caused by the convection in the coating material, and a Benard cell structure is formed on the surface of the coating layer. At this time, since the fine particles 13 have wide particle size distribution, for example, as the convection in the coating material progresses, first, the motions of the fine particles 13 having relatively large particle sizes decrease. The fine particles 13 having relatively small particle sizes are properly aggregated in the in-plane direction in the fine particles 13 having the relatively large particle sizes, convex portions are formed, and the gentle micro concave/convex shapes having a long cycle are formed on the surface. Since the fine particles 13 having the relatively small particle sizes exist so as to fill spaces among the fine particles 13 having the relatively large particle sizes, ridge line portions between the convex portions are continuously formed.

It is considered that a relation between a polarity of the fine particles 13 and the surface tension of the solvent exercises an influence on a step of forming the Benard cell structure by properly causing the convection in the coating material. To control the Benard cell structure, it is preferable to adjust the surface tension of the solvent in accordance with the polarity of the fine particles 13. For example, when a proper amount of fine particles 13 whose surfaces are non-polar are added, it is preferable to adjust the surface tension of the solvent to 23 mN/m or less. This is because if the surface tension is larger than 23 mN/m the aggregation of the fine particles 13 becomes hard and the large concave/convex portions are formed on the surface of the anti-glare layer 12, so that the layer becomes a white muddiness and the surface becomes glossy.

On the other hand, the gentle wavy micro concave/convex portions are formed onto the surface of the coating film by the meniscuses of the liquid resin formed in the Benard cells. To maintain the meniscuses formed in the Benard cells even after the drying, it is preferable to use the resin which is liquid until it is cured even after the drying step. This is because even if the layer is dried, the gentle waviness of the surface can be held. It is considered that in the case of containing the dry curing resin serving as a solid after the drying, since the substrate 11 is flat, the surface of the anti-glare layer 12 formed on the substrate 11 is flattened by the initial drying, and even after the layer was perfectly dried up to the inside thereof through the drying step, it is flattened according to the substrate 11.

A drying condition is not particularly limited but the layer may be dried by a natural drying or can be also artificially dried by adjusting a drying temperature, a drying time, and the like. However, for example, in the case of blowing a wind upon drying, it is necessary to pay attention so that no windwrought patterns are caused on the coating layer surface. This is because desired gentle wavy concave/convex shapes cannot be obtained on the surface of the anti-glare layer 12 and both of the anti-glare property and the contrast cannot be satisfied. The drying temperature and the drying time can be properly decided by a boiling point of the solvent contained in the coating material. In such a case, it is preferable that in consideration of a heat resistance of the substrate 11, the drying temperature and the drying time are selected within such a range where a deformation of the substrate is not caused by a heat contraction. In the specification, the Benard cells which are caused at the time of drying incorporate not only the cells which are formed when the layer is purposely dried by the drying step but also the cells which are formed since the solvent is volatilized in a state where, for example, the coating film is left in order to flatten it after the coating.
(Curing)

After drying, by curing the ionizing radiation curable type resin, the anti-glare layer 12 is formed. Although there are, for example, an electron beam, an ultraviolet ray, visible light, a gamma ray, and the like as a curing energy source, the ultraviolet ray is preferable from a viewpoint of producing facilities. Further, the ultraviolet ray source is not particularly limited but a high pressure mercury lamp, a metal halide lamp, or the like is properly used. As a cumulative irradiation amount, a cumulative irradiation amount of such an extent that the curing of the resin which is used and after-yellowing of the resin and the substrate 11 do not occur can be properly selected. An atmosphere of the irradiation can be properly selected in accordance with a degree of the resin curing. The irradiation can be performed in the air or an inert atmosphere such as nitrogen or argon.

By the curing step, the resin is solidified in a state where the Benard cells have been formed and the anti-glare layer 12 having the gentle concave/convex shapes on the surface is formed.

Consequently, the target anti-glare film is obtained.

According to the first embodiment, when the solvent contained in the coating material is volatilized, by forming the Benard cells by the convection and aggregation of the fine particles 13 having the wide particle size distribution, the surface of the anti-glare layer 12 becomes the gentle wavy micro concave/convex shapes. The matter defects can be reduced by removing the large-sized particles contained in the fine particles 13. Therefore, the anti-glare film 1 which has the high contrast, the excellent anti-glare property, and further, in which the rough surface appearance is small can be realized. By using the anti-glare film 1 for the liquid crystal display apparatus, the visibility of the image which is displayed on the liquid crystal display apparatus can be improved.

(2) Second Embodiment (2-1) Construction of Anti-Glare Film

Figure 4:
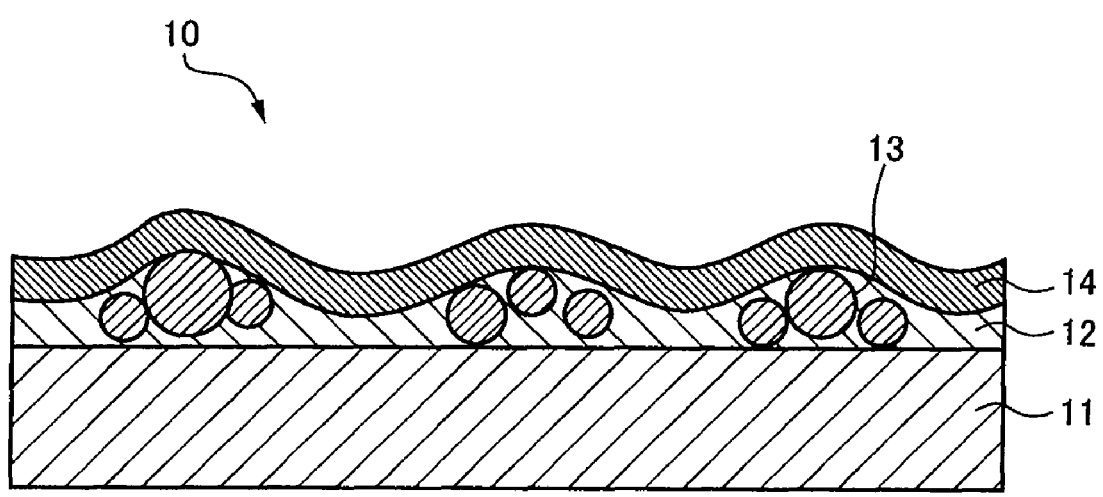
FIG. 4 is a schematic cross sectional view showing an example of a construction of an anti-glare film according to the second embodiment.

FIG. 4 shows an example of a construction of an anti-glare film 10 according to the second embodiment. In the anti-glare film 10, the anti-glare layer 12 having the fine particles 13 is formed on the substrate 11 and a transparent resin layer 14 having a translucent property is formed on the anti-glare layer 12. The substrate 11, anti-glare layer 12, and fine particles 13 are similar to those in the foregoing first embodiment. The micro concave/convex shapes formed by the convection and aggregation of the fine particles 13 are formed on the surface of the anti-glare layer 12.

The transparent resin layer 14 is laminated onto the anti-glare layer 12, is a layer having, for example, a refractive index smaller than that of the anti-glare layer 12, and can reduce a reflectance of the surface. The transparent resin layer 14 is formed, for example, along the anti-glare layer 12 and covers the surface of the fine particles 13 exposed from the surface of the anti-glare layer 12, so that the convex portions including steep angle components are eliminated. Since the micro concave/convex shapes on the surface of the anti-glare layer 12 of a lower layer are maintained and only the slopes near the fine particles 13 contained in the anti-glare layer 12 become gentle, the gentle wavy micro concave/convex shapes which are equivalent or better than the micro concave/convex shapes formed on the surface of the anti-glare layer 12 are formed onto the surface of the transparent resin layer 14. A root mean square roughness RΔq of a roughness curve as a parameter showing the surface roughness of the transparent resin layer 14 is preferably equal to a range from 0.003 to 0.05. When the root mean square slope RΔq satisfies the above range, both of the contrast and the anti-glare property can be satisfied.

Figure 5:
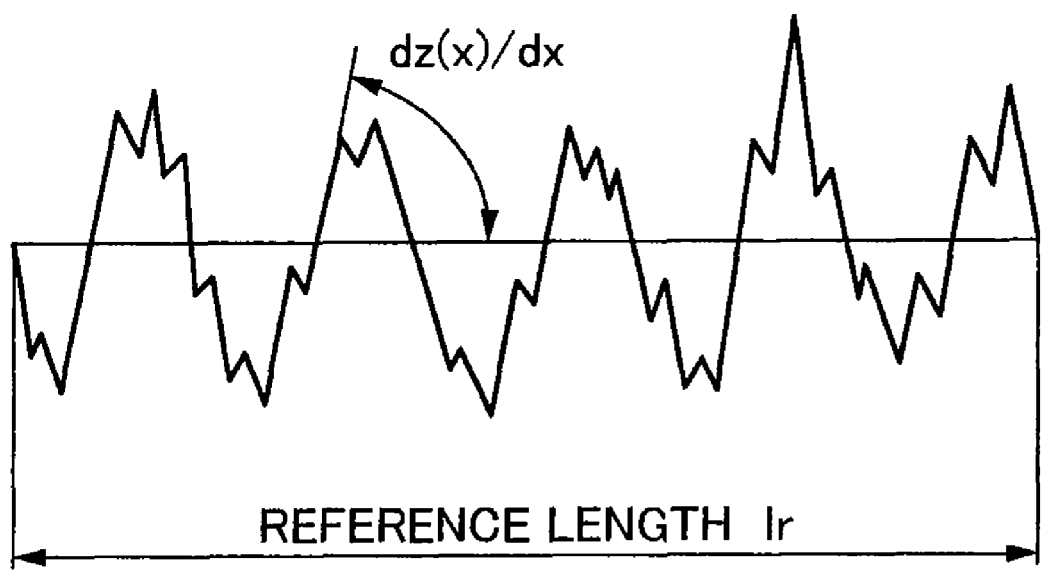
FIG. 5 is a schematic diagram for explaining a root mean square slope.

The root mean square roughness RΔq of the roughness curve is a parameter which is obtained by averaging slopes in a micro range. FIG. 5 is a schematic diagram for explaining the root mean square slope and RΔq is expressed by the following numerical expression.

RΔq (or Rdq): Root mean square slope of the roughness curve

Root mean square of a local slope dz/dx at a reference length $$R\Delta q = \sqrt{\frac{1}{lr}\int_0^{lr}\left(\frac{d}{dx}Z(x)\right)^2 dx}$$ (Numerical expression 1)

According to the anti-glare film 10 of the second embodiment, while the anti-glare property is maintained, the appearance of white muddiness is suppressed to an extent which is equivalent to or more than that of the anti-glare film 1 of the first embodiment, and the excellent contrast can be realized. By forming the transparent resin layer 14 onto the surface of the anti-glare layer 12, for example, the reflection on the surface of the anti-glare layer 12 can be reduced and a pollution resistance can be also applied to the surface of the anti-glare layer 12.

(2-2) Manufacturing Method of Anti-Glare Film

Subsequently, an example of a manufacturing method of the anti-glare film 10 according to the second embodiment will be described. According to the manufacturing method of the anti-glare film 10, the anti-glare layer 12 of the anti-glare film 1 of the first embodiment is coated with the coating material containing the resin and the solvent and the coating material is dried and cured, thereby forming the transparent resin layer 14. A forming method of the transparent resin layer 14 will be specifically explained hereinbelow.

(Adjustment of Coating Material)

First, the coating material in which, for example, the resin and the solvent are mixed is obtained. At this time, a light stabilizer, an ultraviolet absorbent, an antistatic agent, a flame resistance, an oxidation inhibitor, or the like may be further added as necessary.

The solvent is not particularly limited but any solvent can be used so long as it dissolves the resin raw material which is used and does not dissolve the anti-glare layer 12 serving as a background layer. As such a solvent, for example, an organic solvent such as tertiary butanol, toluene, methylethyl ketone (MEK), isopropyl alcohol (IPA), or methylisobutyl ketone (MIBK) can be used.

As a resin, for example, it is preferable to use at least a resin which is solidified by drying. The resin which is solidified after it was dried is a resin which is cured by drying (hereinbelow, the resin which is solidified by drying is, properly referred to as a dry curing resin) and it is preferable to contain at least one kind of, for example, monomer, oligomer, and polymer whose molecular weight is equal to 30000 or more. This is because by containing the dry curing resin into the coating material, such a situation that when the surface of the anti-glare layer 12 is coated with the coating material, the coating material flows into the concave portions on the surface of the anti-glare layer 12 and the concave portions are embedded, so that the surface is flattened can be suppressed. As such a dry curing resin, for example, an urethane resin, an acrylic resin, methacrylic resin, a styrene resin, a melamine resin, or a cellulose system resin can be mentioned. Although the monomer, oligomer, or polymer which forms the ionizing radiation curing type resin or the thermosetting resin can be used, the invention is not limited to them. As an ionizing radiation curing type resin, for example, it is preferable to use a resin having a functional group such as an acryl double bond. As a thermosetting resin, it is preferable to use a resin having a thermosetting group such as a hydroxyl group or the like. This is because a reactivity is improved when an ionizing radiation curing process or a thermosetting process is executed.

At least one kind of monomer, oligomer, and polymer of the ionizing radiation curing type or the thermosetting type used in the first embodiment can be added into the above dry curing resin, mixed to the foregoing resin material, and used. A material which is cured by and reacts to the material which is used as a dry curing resin is preferably used.

By using a resin material containing, for example, fluorine (F) or the like as a resin material, a pollution resistance can be applied to the surface of the anti-glare layer 12 and the anti-glare layer having further excellent abrasion resistance and water repellency can be obtained.

(Coating)

Subsequently, the anti-glare layer 12 is coated with the coating material derived as mentioned above. A coating method is not particularly limited but a well-known coating method similar to that in the first embodiment is used. By uniformly coating the anti-glare layer 12 with the coating material so as to have a thickness of a predetermined amount, the gentle wavy micro concave/convex shapes which are equivalent to or better than the micro concave/convex shapes on the surface of the anti-glare layer 12 can be formed onto the surface of the coating layer.

(Drying, Curing)

After coating with the coating material, by drying and curing it, the transparent resin layer 14 having the gentle micro concave/convex shapes on the surface is obtained. In order to form the gentle wavy micro concave/convex portions onto the surface of the transparent resin layer 14, it is preferable that at least the dry curing resin is contained in the coating material as mentioned above. If the anti-glare layer 12 is coated with the coating material which does not contain at all the resin materials which are dried and cured, that is, the coating material made of only the resin material such as monomer, oligomer, or polymer which is in the liquid state even after the drying, those resin materials are leveled for a period of time until the resin material is dried and cured after the coating, and the concave portions on the surface of the anti-glare layer 12 are embedded and flattened, so that the anti-glare property deteriorates. On the other hand, since the convex portions on the surface of the anti-glare layer 12 remain as protruded projections, the surface becomes the rough surface. It is, therefore, considered that by allowing the dry curing resin to be contained in the coating material, the gentle waviness of the surface of the anti-glare layer 12 is covered with the dry surface formed by the initial drying, so that the leveling is suppressed and the further gentle wavy components are formed.

In the case where the ionizing radiation curing type resin is contained as a resin, the resin is cured by irradiation of the ionizing radiation and a layer of a low refractive index is formed, In the case where the thermosetting resin is contained, the resin is cured by heating and the transparent resin layer 14 is formed.

In this manner, a target anti-glare film 10 is obtained.

According to the second embodiment, the gentle wavy micro concave/convex shapes which are equivalent to or better than the gentle wavy micro concave/convex portions formed on the surface of the anti-glare layer 12 can be formed onto the surface of the transparent resin layer 14. Therefore, by using the anti-glare film 10 for, for example, various display apparatuses such as liquid crystal display, plasma display, electroluminescence display, and CRT (Cathode Ray Tube) display, while the anti-glare property is maintained, the contrast which is more excellent than that in the first embodiment can be realized, and the visibility can be further improved.

EXAMPLE

Although examples are described hereinbelow, the embodiments are not limited only to those Examples. Examples 1 to 3 correspond to the first embodiment and Example 4 corresponds to the second embodiment.

Example 1

First, as fine particles, crosslinkable styrene beads SBX6 (manufactured by SEKISUI PLASTICS CO., LTD.) whose center particle size is equal to about 6 μm are classified by a micron separator method and the fine particles of 10 μm or more are removed. A mean diameter of the fine particles obtained after the classifying process is equal to 6.3 μm, a medium particle size is equal to 5.5 μm, and a fluctuation coefficient is equal to 31%.

Subsequently, raw materials of the following coating compositions are mixed by using the fine particles obtained after the classifying process. The coating material is stirred for one hour by a magnetic stirrer and filtered through a mesh of 20 μm having a roughness which is equal to or larger than three times as large as the mean diameter. After that, one surface of a triacetyl cellulose (TAC) film (manufactured by Fuji Photo Film Co., Ltd.) having a thickness of 80 μm is coated with the resultant coating material by a bar coater.

(Coating Compositions)

Multifunctional monomer: 100 parts by weight
Polymer: 5 parts by weight
Photopolymerization initiator (IRGACURE 184 manufactured by CIBA-GEIGY Co., Ltd.): 3 parts by weight
Solvent (t-butanol): 153 parts by weight
Crosslinkable styrene beads SBX6 which have been classified (manufactured by SEKISUI PLASTICSCO., LTD.): 3 parts by weight After the coating, the coating material is dried for 2 minutes in a drying furnace at 80° C. Thereafter, it is cured by irradiating the ultraviolet ray at a rate of 300 mJ/cm$^2$, thereby forming an anti-glare layer having a dried film thickness of 11.0 μm. In this manner, a target anti-glare film is obtained.

Example 2

An anti-glare film is obtained in a manner similar to Example 1 except that the fine particles of 12 μm or more are classified and removed and a dried film thickness of an anti-glare layer is set to 11.1 μm. A mean diameter of the fine particles obtained after the classifying process is equal to 5.9 μm, a medium particle size is equal to 6.0 μm, and a fluctuation coefficient is equal to 33%.

Example 3

Crosslinkable styrene beads SBX8 whose center particle size is equal to about 8 μm are used as fine particles and the fine particles of 14 μm or more are classified and removed. A dried film thickness of an anti-glare layer is set to 13.9 μm. An anti-glare film is obtained in a manner similar to Example 1 as other conditions. A mean diameter of the fine particles obtained after the classifying process is equal to 7.3 μm, a medium particle size is equal to 7.4 μm, and a fluctuation coefficient is equal to 34%.

Example 4

Raw materials of the coating compositions containing crosslinkable styrene beads SBX6 (manufactured by SEKISUI PLASTICS CO., LTD.) of 10 parts by weight in which the particles of 10 μm or more have been classified and removed and a solvent (t-butanol) of 163 parts by weight in Example 1 are mixed, thereby forming an anti-glare layer having a dried film thickness of 10.2 μm.

After that, the anti-glare layer is coated with a coating material manufactured by mixing raw materials made of the following coating compositions. The resultant coating material is dried for 2 minutes in the drying furnace at 80° C. Thereafter, it is cured by irradiating the ultraviolet ray at a rate of 300 mJ/cm$^2$, thereby forming a transparent resin layer whose average film thickness after the drying is equal to 3.5 μm. In this manner, an anti-glare film made by two layers is obtained.

(Coating Compositions)
- Multifunctional monomer: 100 parts by weight
- Polymer: 5 parts by weight
- Photopolymerization initiator (IRGACURE 184 manufactured by CIBA-GEIGY Co., Ltd.): 3 parts by weight
- Solvent (t-butanol): 149 parts by weight <Comparison 1>

An anti-glare film is obtained in a manner similar to Example 1 except that the fine particles having particle size distribution in which a mean diameter is equal to 6.3 μm, a medium particle size is equal to 6.1 μm, and a fluctuation coefficient is equal to 36% are used as they are without executing the classifying process of the fine particles and a dried film thickness of an anti-glare layer is set to 11.1 μm.

<Comparison 2>

An anti-glare film is obtained in a manner similar to Example 1 except that the fine particles of 15 μm or more are classified and removed and a dried film thickness of an anti-glare layer is set to 11.2 μm. In addition, a mean diameter of the fine particles obtained after the classifying process is equal to 6.2 μm, a medium particle size is equal to 6.1 μm, and a fluctuation coefficient is equal to 35%.

<Comparison 3>

An anti-glare film is obtained in a manner similar to Example 1 except that a bar coater of a different count is used and a dried film thickness of an anti-glare layer is set to 4.9 μm.

(Classifying Process)

In the foregoing Examples 1 to 4 and Comparisons 1 to 3, the classifying process is executed by using the micron separator.

(Mean Diameter)

In the foregoing Examples 1 to 4 and Comparisons 1 to 3, the mean diameter of the fine particles is obtained by measuring the particle sizes by Coulter Multisizer and averaging obtained data.

In the measurement of the dried film thicknesses of the anti-glare layers in Examples 1 to 3 and Comparisons 1 to 3 and the dried film thicknesses of the anti-glare layer and the transparent resin layer in Example 4, cross sections obtained by cutting samples are SEM observed and thicknesses of binder portions can be also measured. However, in the present evaluation, they are measured by using the following methods.

(Measurement of Film Thickness)

In the measurement of the film thicknesses, first, the whole film thickness including the particles are measured by using a Thickness Measuring Instrument (manufactured by TESA Co., Ltd.). Subsequently, surface roughnesses of those films are measured according to JIS B601:2001, a roughness curve is obtained from a 2-dimensional cross sectional curve, and an arithmetic mean roughness Ra is calculated as a roughness parameter. A measuring apparatus and measuring conditions will be shown below.

Measuring apparatus: Automatic Microfigure Measuring Instrument SURFCORDER ET4000A (manufactured by Kosaka Laboratory Ltd.)
λc=0.8 mm, evaluation length=4 mm, cut-off×5 times, data sampling interval=0.5 μm Finally, the film thickness of the anti-glare layer is obtained by subtracting the arithmetic mean roughness Ra from the total thickness measured by the Thickness Measuring Instrument.

Particle size distribution characteristics of the fine particles used in the foregoing Examples 1 to 4 and Comparisons 1 to 3 are shown in the following Table 1.

TABLE 1

| | TYPE OF FINE PARTICLES | CLASSIFYING PROCESS [μM] | MEAN DIAMETER [μM] | MEDIUM PARTICLE SIZE [μM] | FLUCTUATION COEFFICIENT [%] |
|---|---|---|---|---|---|
| EXAMPLE 1 | SBX6 | 10 | 5.4 | 5.5 | 31 |
| EXAMPLE 2 | SBX6 | 12 | 5.9 | 6.0 | 33 |
| EXAMPLE 3 | SBX8 | 14 | 7.3 | 7.4 | 34 |
| EXAMPLE 4 | SBX6 | 10 | 5.4 | 5.5 | 31 |
| COMPARISON 1 | SBX6 | NONE | 6.3 | 6.1 | 36 |
| COMPARISON 2 | SBX6 | 15 | 6.2 | 6.1 | 35 |
| COMPARISON 3 | SBX6 | 10 | 5.4 | 5.5 | 31 |

Figure 6:
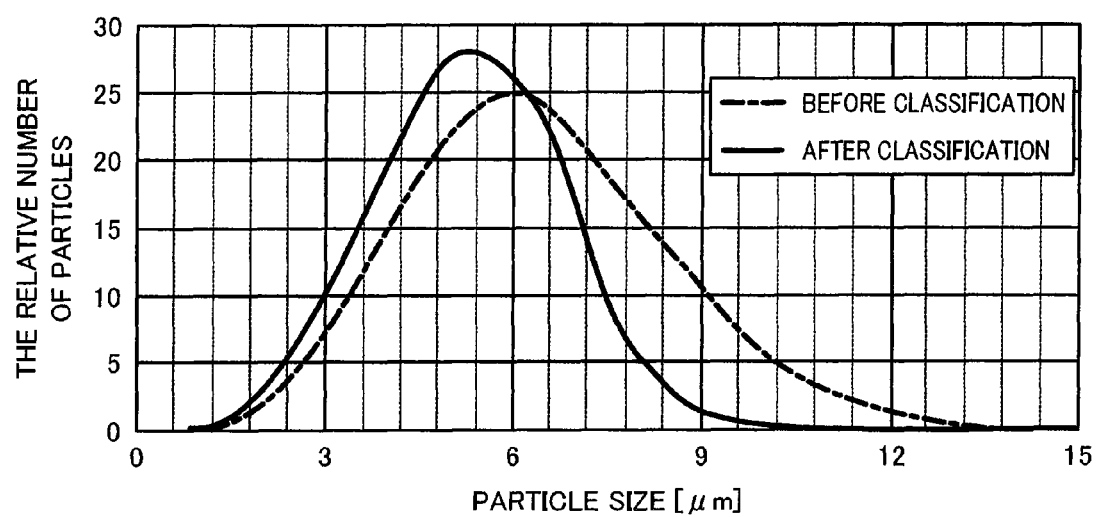
FIG. 6 is a diagram showing particle size distribution obtained before classification and after the classification of the fine particles in Example 1.

Results obtained by measuring particle size distribution obtained before classification and after the classification of the fine particles used in Example 1 by the colter multisizer are shown in FIG. 6. The fine particles before classification correspond to the fine particles of Comparison 1 in which the classifying process is not executed. It will be understood from FIG. 6 that the medium particle size of the fine particles after the classification is smaller than the medium particle size of the fine particles before the classification. Although the mean diameter is decreased by about 1 μm due to the classification, the large-sized particles of 10 μm or more exist at a ratio of about 6% before the classification and such a ratio can be reduced to about 0.4% after the classification.

[Evaluation]

With respect to Examples 1 to 4 and Comparisons 1 to 3, an outer haze, an anti-glare property, a degree of white muddiness, a rough surface appearance, and a matter defect are measured as an optical characteristics evaluation by the following methods, respectively.

(Evaluation of Outer Haze)

A haze is measured on the basis of measuring conditions according to JIS K7136 by using a Haze Meter HM-150 (manufactured by MURAKAMI COLOR RESEARCH LABORATORY). The measurement is performed with respect to the following two kinds of films: a single body of each anti-glare film of Examples 1 to 4 and Comparisons 1 to 3, and an anti-glare film obtained by adhering a pressure sensitive adhesive whose haze value is equal to 1% or less onto the surface of the anti-glare layer of each of those anti-glare films. A difference between them is obtained as an outer haze.

(Evaluation of Anti-Glare Property)

With respect to each anti-glare film of Examples 1 to 4 and Comparisons 1 to 3, in order to suppress an influence of the reflection of a back surface and evaluate the anti-glare property of the anti-glare film itself, the back surface of each of the manufactured anti-glare films is adhered onto black glass through the pressure sensitive adhesive. After that, in a state where two fluorescent lamps are exposed, the fluorescent lamps arranged in parallel are used as a light source. An image reflected to each anti-glare film is observed by the eyes from the regular reflecting direction. The presence or absence of the reflected image of the fluorescent lamps is evaluated on the basis of the following criteria.

A: Outlines of the fluorescent lamps are obscure (the two fluorescent lamps are seen like one lamp).
    B: Although the fluorescent lamps can be recognized to a certain extent, the outlines are blurred.
    C: The fluorescent lamps are reflected as they are.

(Evaluation of Degree of White Muddiness)

An appearance of white muddiness is perceived when diffused light of the fluorescent lamps or the like as a light source is diffused on the surface of the anti-glare layer and the reflection light is detected. Therefore, a value which has been quantized by reproducing the above phenomenon like a simulation by using a commercially available spectrophotometric colorimeter is assumed to be a degree of white muddiness. A specific measuring method of the degree of white muddiness is as follows. First, in order to suppress the influence of the back surface reflection and evaluate the diffuse reflection of the anti-glare film itself, the back surface of each of the manufactured anti-glare films of Examples 1 to 4 and Comparisons 1 to 3 is adhered onto the black glass through the pressure sensitive adhesive. After that, there is used a d/8° optical system in which an integrating sphere type spectrophotometric colorimeter SP64 (manufactured by X-Rite Co., Ltd.) is used, diffused light is irradiated onto the surface of each anti-glare film, and reflection light is measured by a detector existing at a position which is inclined in the direction by 8° from the normal direction of each anti-glare film. The measurement is performed at a detection viewing angle 2° by using an SPEX mode for detecting only a diffuse reflection component excluding a regular reflection component. In addition, it has been confirmed by experiments that there is a correlation between the degree of white muddiness which is measured by the above method and an appearance of white muddiness which is visually perceived.

(Evaluation of Rough Surface Appearance and Matter Defects)

With respect to each anti-glare film of Examples 1 to 4 and Comparisons 1 to 3, in order to suppress the influence of the back surface reflection and evaluate the rough surface appearance and the number of matter defects of the anti-glare film, the back surface of the manufactured anti-glare film is adhered onto the black glass through the pressure sensitive adhesive. After that, a light box (manufactured by HAKUBA Photo Industry Co., Ltd.) is used as a plane light source, light is irradiated from the direction which is inclined by about 30° from the normal direction of the anti-glare film, an image reflected to each anti-glare film is observed by the eyes at a distance away in the regular reflecting direction by about 50 cm, and the rough surface appearance is evaluated on the basis of the following criteria.

◉: The rough surface appearance due to the matters is not perceived and the film is seen like a smooth surface.
    ○: Since the film is seen white as a whole, the rough surface appearance due to the matters is not perceived.
    Δ: Since the matters are dotted and reflection light intensity only in such a portion differs, such a portion is seen like a defect.
    x: Since there are many matters, the film is seen like a rough surface as a whole.

A sample cut into a 10 cm square is used and the number of matter defects which are clearly visually perceived is also counted.

Results of the film thicknesses and the optical characteristics evaluation of Examples 1 to 4 and Comparisons 1 to 3 evaluated as mentioned above are shown in Table 2. In addition, a value obtained by adding the thicknesses of the anti-glare layer and the transparent resin layer is shown in a column of the film thickness of the anti-glare layer in Example 4. With respect to the rough surface appearance, the number of matter defects which are clearly visually perceived in the 10 cm square is also shown in parentheses. When a haze value is equal to 1% or less, since a measurement result is influenced by the adhered pressure sensitive adhesive or measuring precision, ≦1.0% is shown in Table 2.

TABLE 2

| | FILM THICKNESS OF ANTI-GLARE LAYER [μM] | SURFACE HAZE [%] | ANTI-GLARE PROPERTY | DEGREE OF WHITE MUDDINESS [%] | ROUGH SURFACE APPEARANCE DUE TO MATTERS |
|---|---|---|---|---|---|
| EXAMPLE 1 | 11.0 | 2.0 | B | 1.0 | ◉ (0) |
| EXAMPLE 2 | 11.1 | 2.0 | B | 1.0 | ◉ (0) |
| EXAMPLE 3 | 13.9 | 2.8 | B | 1.1 | ◉ (0) |
| EXAMPLE 4 | 13.7 | ≦1.0 | B | 0.9 | ◉ (0) |
| COMPARISON 1 | 11.2 | 2.1 | B | 1.3 | X (100 OR MORE) |
| COMPARISON 2 | 11.2 | 2.1 | B | 1.2 | Δ (31) |
| COMPARISON 3 | 4.9 | 27.0 | A | 3.6 | ○ (7) |

Example 1 in which the classifying process has been executed at 10 μm and Example 2 in which the classifying process has been executed at 12 μm by using the SBX6 filler using the fine particles whose mean diameter is equal to 6.3 μm are compared with Comparison 1 in which the classifying process is not executed. Although the outer hazes are equal to 2.0 to 2.1% and are hardly different, in Examples 1 and 2 in which the classifying process has been executed at a particle size which is equal to or less than twice as large as the mean diameter, no matter defects are observed and the smooth surface is obtained. On the other hand, in Comparison 1, a number of matter defects are observed and the rough surface appearance is large. In Comparison 2 in which the classifying process has been executed at a particle size which is equal to or larger than twice as large as the mean diameter, although the rough surface appearance is improved more than that in Comparison 1 in which the classifying process is not executed, it is insufficient and the matter defects are also visually perceived in a narrow region of the 10 cm square.

In Comparison 3, since the fine particles are projected from the coating film surface and the anti-glare property is effected by using the large surface roughness, the outer haze is so large to be equal to 27% and the anti-glare property of such an extent that the outlines of the reflected fluorescent lamps are obscure is obtained. According to the anti-glare film of the outer haze type as mentioned above, since the surface is rough, the fine particles other than the extremely large fine particles are not conspicuous as defects and the number of defects which are visually perceived in the 10 cm square is equal to 7 and is perceived as a small number of particles. However, such an outer haze type anti-glare film has such a problem that the appearance of white muddiness is strong and the contrast decreases. It is preferable that the degree of white muddiness measured by the present evaluating method is equal to 2% or less. For this purpose, it is necessary to form the smooth surface shapes and suppress the outer haze to 5% or less.

On the other hand, by further forming the transparent resin layer onto the anti-glare layer formed by removing the large-sized particles in a manner similar to Example 4, the surface waviness becomes more gentle and an anti-glare film in which the degree of white muddiness is reduced can be obtained.

It has been found that, as mentioned above, the fine particles having wide particle size distribution are used, the particle size is adjusted so as to remove the large-sized particles, the anti-glare layer is set to a proper film thickness according to the particle sizes of the fine particles, and the anti-glare layer having the micro concave/convex portions on the surface is formed, so that an anti-glare film which does not have the rough surface appearance due to the matter defects but has the smooth surface shapes and further has the high contrast and the anti-glare property can be realized.

Comparison Between Examples 1 to 3 and Comparison 1

In Examples 1 to 3, since the fine particles whose particle sizes are equal to 10 to 14 μm or more are classified, the fine particles are substantially constructed by the fine particles whose particle sizes are less than twice as large as the anti-glare layer. On the other hand, in Comparison 1, since the classifying process is not executed, the fine particles substantially contain the fine particles whose particle sizes are equal to or larger than twice as large as the anti-glare layer.

Owing to such a difference as mentioned above, in Examples 1 to 3, the rough surface appearance due to the matters can be remarkably reduced as compared with that in Comparison 1.

Comparison Between Examples 1 and 3 and Comparison 2

In Examples 1 and 3, since the classifying process is executed at the particle sizes less than twice as large as the mean diameter of the fine particle, a content of the fine particles having the particle sizes less than twice as large as the mean diameter among all fine particles is equal to 2% or less. On the other hand, in Comparison 2, since the classifying process is executed at the particle sizes which are equal to or larger than twice as large as the mean diameter of the fine particles, a content of the fine particles having the particle sizes which are equal to or larger than twice as large as the mean diameter among all of the fine particles exceeds 2%.

Due to such a difference as mentioned above, in Examples 1 and 3, the rough surface appearance due to the matters can be reduced as compared with that in Comparison 2.

Comparison Between Examples 1 to 3 and Comparison 3

In Examples 1 to 3, since the thickness of anti-glare layer is equal to or larger than the mean diameter of the fine particles, the fine particles are covered with the resin (binder) of the anti-glare layer. On the other hand, in Comparison 3, since the thickness of anti-glare layer is less than the mean diameter of the fine particles, the fine particles are projected from the anti-glare layer surface.

Due to such a difference as mentioned above, in Examples 1 to 3, the rough surface appearance due to the matters can be reduced and both of the anti-glare property and the contrast can be satisfied as compared with that in Comparison 3.

<Reference 1>

A coating is continuously performed by the gravure coater as follows, thereby manufacturing a long anti-glare film of 100 m.

First, styrene fine particles of 200 g whose particle sizes are equal to 5 to 7 μm and whose mean diameter is equal to 6 μm, liquid 4-functional urethane acrylic oligomer of 4000 g of the ultraviolet curing type serving as a resin material, and IRGA-CURE 184 (manufactured by CIBA-GEIGY Co., Ltd.) of 200 g serving as a photoreactive initiator are added to tertiary butanol of 6000 g whose surface tension is equal to 20.0 mN/m and serving as a solvent and they are stirred. After a coating material was adjusted, it is filtered by a filter of a mesh of 10 μm.

Subsequently, a triacetyl cellulose (TAC) film having a thickness of 80 μm is coated with the filtered coating material at a coating rate of 20 m/minute by the gravure coater. The film after the coating is dried in a drying furnace having a length of 30 m whose drying temperature has been set to 80° C. In this instance, a Marangoni convection due to uneven distribution of the surface tension which is generated at the time of volatilization of the solvent is used, a collision and an aggregation of the fine particles are properly caused by the convection in the coating material and a Benard cell structure is formed on the coating layer surface. Gentle wavy micro concave/convex portions are formed onto the coating film surface by meniscuses of the liquid resin formed in the Benard cells. After that, the film enters continuously an ultraviolet curing furnace, the ultraviolet ray is irradiated under conditions of 160 W and a cumulative light amount of 300 mJ/cm$^2$ and an anti-glare layer whose average film thickness after the drying is equal to 6 μm is formed, thereby obtaining a wound anti-glare film.

<Reference 2>

An anti-glare film is obtained in a manner similar to Reference 1 except that the film thickness after the drying is set to 8 μm.

<Reference 3>

An anti-glare film is obtained in a manner similar to Reference 1 except that the film thickness after the drying is set to 12 μm.

<Reference 4>

An anti-glare film is obtained in a manner similar to Reference 1 except that the film thickness after the drying is set to 15 μm.

<Reference 5>

An anti-glare film is obtained in a manner similar to Reference 1 except that the film thickness after the drying is set to 18 μm.

<Reference 6>

An anti-glare film is obtained in a manner similar to Reference 1 except that isopropyl acetate whose surface tension is equal to 22.1 mN/m is used as a solvent.

<Reference 7>

A coating material in which an acryl polymer of 1000 g whose molecular amount is equal to 50000 and which is dried and cured is dissolved as a resin material into methylisobutyl ketone (MIBK) of 5000 g whose surface tension is equal to 25.4 mN/m serving as a solvent is adjusted. Thereafter, the anti-glare layer of the anti-glare film of Reference 1 is coated with the resultant coating material by the gravure coater. The coating material is dried in the drying furnace at 80° C. and cured, thereby forming a transparent resin layer whose average film thickness after the drying is equal to 6 μm. In this manner, an anti-glare film is obtained.

<Reference 8>

An anti-glare film is obtained in a manner similar to Reference 1 except that the fine particles are changed to an acryl-styrene copolymer (acryl of 10 mass %, styrene of 90 mass %) and the solvent is changed to toluene.

<Reference 9>

An anti-glare film is obtained in a manner similar to Reference 1 except that the fine particles are changed to an acryl-styrene copolymer (acryl of 30 mass %, styrene of 70 mass %) and the solvent is changed to methylethyl ketone (MEK).

<Reference 10>

An anti-glare film is obtained in a manner similar to Reference 1 except that the fine particles are changed to an acryl-styrene copolymer (acryl of 30 mass %, styrene of 70 mass %) and the solvent is changed to butyle acetate.

<Reference 11>

An anti-glare film is obtained in a manner similar to Reference 1 except that the fine particles are changed to an acryl-styrene copolymer (acryl of 30 mass %, styrene of 70 mass %) and the solvent is changed to MIBK.

<Reference 12>

An anti-glare film is obtained in a manner similar to Reference 1 except that the fine particles are changed to an acryl-styrene copolymer (acryl of 30 mass %, styrene of 70 mass %) and the solvent is changed to toluene whose surface tension is equal to 27.9 mN/m.

<Reference 13>

An anti-glare film is obtained in a manner similar to Reference 1 except that the fine particles are changed to an acryl-styrene copolymer (acryl of 30 mass %, styrene of 70 mass %) and the solvent is changed to dimethyl carbonate.

<Reference 14>

An anti-glare film is obtained in a manner similar to Reference 1 except that the fine particles are changed to an acryl-styrene copolymer (acryl of 30 mass %, styrene of 70 mass %) and the solvent is changed to a mixture solvent of toluene of 40 parts by weight and dimethyl carbonate of 60 parts by weight.

<Reference 15>

An anti-glare film is obtained in a manner similar to Reference 1 except that the fine particles are changed to an acryl-styrene copolymer (acryl of 30 mass %, styrene of 70 mass %) and the solvent is changed to a mixture solvent of toluene of 60 parts by weight and dimethyl carbonate of 40 parts by weight.

<Reference 16>

An anti-glare film is obtained in a manner similar to Reference 1 except that the fine particles are changed to an acryl-styrene copolymer (acryl of 30 mass %, styrene of 70 mass %) and the solvent is changed to a mixture solvent of toluene of 80 parts by weight and MEK of 20 parts by weight.

<Reference 17>

An anti-glare film is obtained in a manner similar to Reference 1 except that the fine particles are changed to an acryl-styrene copolymer (acryl of 30 mass %, styrene of 70 mass %) and the solvent is changed to a mixture solvent of butyle acetate of 60 parts by weight and dimethyl carbonate of 40 parts by weight.

<Reference 18>

An anti-glare film is obtained in a manner similar to Reference 1 except that the fine particles are changed to an acryl-styrene copolymer (acryl of 30 mass %, styrene of 70 mass %) and the solvent is changed to a mixture solvent of MIBK of 60 parts by weight and dimethyl carbonate of 40 parts by weight.

<Reference 19>

An anti-glare film is obtained in a manner similar to Reference 1 except that the fine particles are changed to an acryl-styrene copolymer (acryl of 40 mass %, styrene of 60 mass %) and the solvent is changed to MIBK.

<Reference 20>

An anti-glare film is obtained in a manner similar to Reference 1 except that the fine particles are changed to an acryl-styrene copolymer (acryl of 40 mass %, styrene of 60 mass %) and the solvent is changed to toluene whose surface tension is equal to 27.9 mN/m.

<Reference 21>

An anti-glare film is obtained in a manner similar to Reference 1 except that an addition amount of the styrene fine particles is changed to 160 g.

<Reference 22>

An anti-glare film is obtained in a manner similar to Reference 1 except that the addition amount of the styrene fine particles is changed to 400 g.

<Reference 23>

An anti-glare film is obtained in a manner similar to Reference 1 except that the addition amount of the styrene fine particles is changed to 600 g.

<Reference 24>

An anti-glare film is obtained in a manner similar to Reference 1 except that the styrene fine particles whose mean diameter is equal to 4 μm are used and the layer is coated so that an average film thickness after the drying is equal to 4 μm.

<Reference 25>

An anti-glare film is obtained in a manner similar to Reference 1 except that the styrene fine particles whose mean diameter is equal to 8 μm are used and the layer is coated so that an average film thickness after the drying is equal to 8 μm.

<Reference 26>

An anti-glare film is obtained in a manner similar to Reference 1 except that the styrene fine particles whose mean diameter is equal to 10 μm are used and the layer is coated so that an average film thickness after the drying is equal to 10 μm.

<Reference 27>

An anti-glare film is obtained in a manner similar to Reference 1 except that the film thickness after the drying is set to 4 μm.

<Reference 28>

An anti-glare film is obtained in a manner similar to Reference 1 except that the addition amount of the styrene fine particles is changed to 120 g.

<Reference 29>

An anti-glare film is obtained in a manner similar to Reference 1 except that a film thickness after the drying is set to 5 μm.

<Reference 30>
An anti-glare film is obtained in a manner similar to Reference 1 except that MIBK is used as a solvent.
<Reference 31>
An anti-glare film is obtained in a manner similar to Reference 1 except that toluene is used as a solvent.
<Reference 32>
An anti-glare film is obtained in a manner similar to Reference 1 except that acryl fine particles whose mean diameter is equal to 6 µm are used as fine particles.
<Reference 33>
An anti-glare film is obtained in a manner similar to Reference 1 except that the fine particles are changed to acryl and the solvent is changed to toluene.
<Reference 34>
An anti-glare film is obtained in a manner similar to Reference 6 except that the fine particles are changed to an acryl-styrene copolymer (acryl of 75 mass %, styrene of 25 mass %).
<Reference 35>
An anti-glare film is obtained in a manner similar to Reference 6 except that the fine particles are changed to an acryl-styrene copolymer (acryl of 55 mass %, styrene of 45 mass %).
<Reference 36>
An anti-glare film is obtained in a manner similar to Reference 31 except that the film thickness is changed to 4 µm.
<Reference 37>
An anti-glare film is obtained in a manner similar to Reference 31 except that the addition amount of the fine particles is changed to 800 g and the film thickness is changed to 4 µm.
<Reference 38>
An anti-glare film is obtained in a manner similar to Reference 1 except that an acryl polymer whose molecular amount is equal to 50000 and which is dried and cured is used as a resin material and dried at 80° C.
<Reference 39>
A coating material in which liquid 4-functional urethane acrylic oligomer of 1000 g has been dissolved as a resin material into methylisobutyl ketone (MIBK) of 5000 g as a solvent is adjusted. After that, the anti-glare layer of the anti-glare film of Reference 1 is coated with the resultant coating material by the gravure coater. The solvent is volatilized in the drying furnace of 80° C. Thereafter, the ultraviolet ray is irradiated in an ultraviolet curing furnace under conditions of 160 W and a cumulative light amount of 300 mJ/cm$^2$, thereby forming a transparent resin layer whose average film thickness after the drying is equal to 6 µm. In this manner, an anti-glare film is obtained.

(Roughness Evaluation)

With respect to the anti-glare films of References 1 to 39 obtained as mentioned above, the surface roughnesses are measured, a roughness curve is obtained from a 2-dimensional cross sectional curve, and a root mean square roughness R$\Delta$q of the roughness curve is calculated as a roughness parameter. Results are shown in Table 3 and Table 4. In addition, measuring conditions conform with JIS B0601: 2001. A measuring apparatus and the measuring conditions will be shown below.

Measuring apparatus: Automatic Microfigure Measuring Instrument SURFCORDER ET4000A (manufactured by Kosaka Laboratory Ltd.)
λc=0.8 mm, evaluation length=4 mm, cut-off×5 times (Anti-Glare Property)

With respect to the anti-glare films of References 1 to 39, the anti-glare properties are evaluated. Specifically speaking, exposed fluorescent lamps are projected onto the anti-glare films and a way of blurring of reflected images is evaluated by the following criteria. Results are shown in Tables 3 and 4.

⊚: Outlines of the fluorescent lamps are obscure (the two fluorescent lamps are seen like one lamp).
○: Although the fluorescent lamps can be recognized to a certain extent, the outlines are blurred.
×: The fluorescent lamps are reflected as they are.

(Degree of White Muddiness)

With respect to the anti-glare films of References 1 to 39, the degrees of white muddiness are measured. A specific measuring method of the degrees of white muddiness is shown below. First, in order to suppress the influence of the back surface reflection and evaluate the diffuse reflection of the anti-glare film itself, the back surface of the obtained anti-glare films is adhered onto black glass through the pressure sensitive adhesive. Subsequently, the measurement is performed by the d/8° optical system in which the integrating sphere type spectrophotometric colorimeter SP64 (manufactured by X LIGHT Co., Ltd.) is used, the diffused light is irradiated onto the surface of a sample, and reflection light is measured by the detector existing at the position which is inclined in the direction by 8° from the normal direction of the sample. The measurement value is obtained at the detection viewing angle 2° by using the SPEX mode for detecting only the diffuse reflection component excluding the regular reflection component. It has been confirmed by experiments that there is a correlation between the measured degree of white muddiness and the appearance of white muddiness which is visually perceived. Results are shown in Tables 3 and 4.

A degree of white muddiness in the case where a black acrylic sheet (ACRYLITE L502 manufactured by Mitsubishi Rayon Co., Ltd.) has been adhered onto the back surface of each anti-glare film of References 1 to 39 through the pressure sensitive adhesive is calculated by the following equation (2). Results are shown in Tables 3 and 4. A value of the degree of white muddiness in the case where the black acrylic sheet is measured in a state where the anti-glare film is not adhered is equal to 0.2.

$$y=1.1039x-0.4735 \quad (2)$$

There is a correlation between the measured degree of white muddiness and the appearance of white muddiness which is visually perceived as mentioned above. It has been confirmed that when the value (Y value) calculated as mentioned above exceeds 1.7%, it is perceived that the film is white muddy, when it is equal to 1.7% or less, the smaller such a value is, the weaker the appearance of white muddiness becomes, and when it is equal to 0.8% or less, the appearance of white muddiness is hardly perceived. In addition, a deriving method of the above equation (2) will be described hereinafter.

(Aggregation in the In-Plane Direction)

Figure 7:
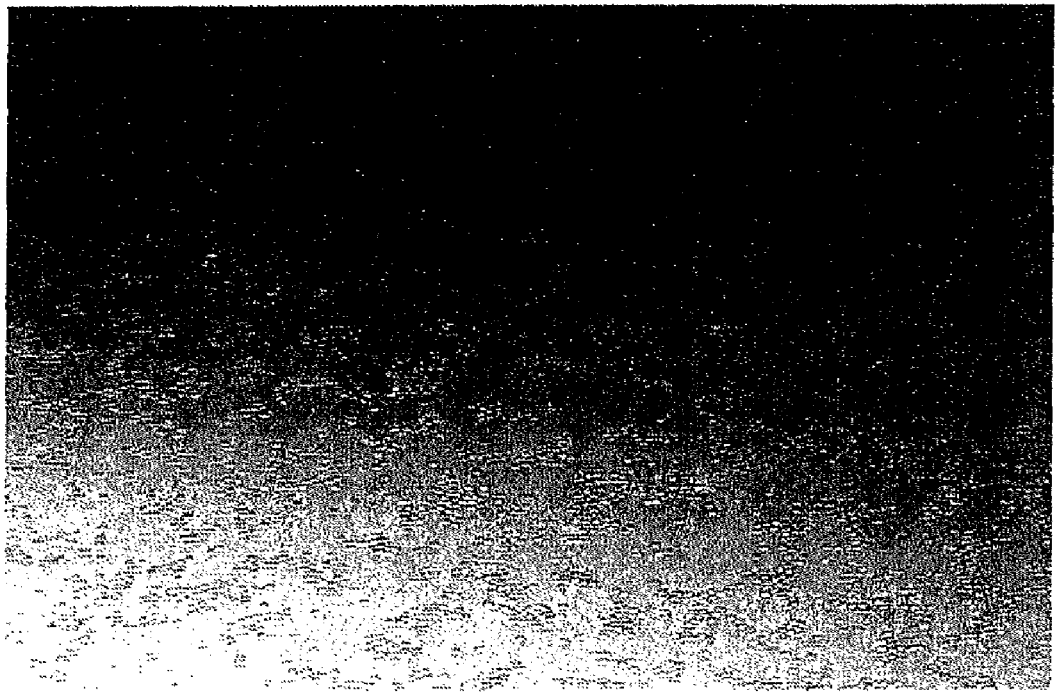
FIG. 7 is a surface photograph of an anti-glare film of Reference 1.
Figure 8:
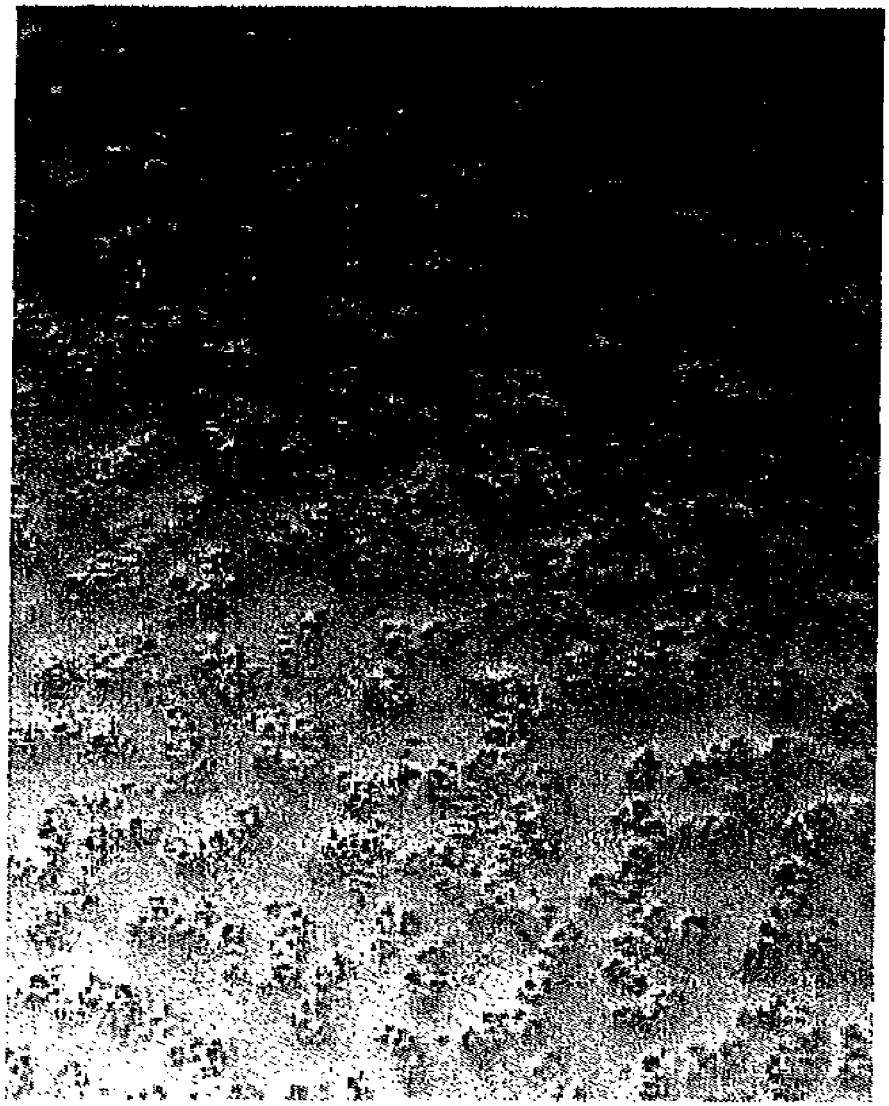
FIG. 8 is a surface photograph of an anti-glare film of Reference 31.

An aggregation state of the organic fine particles is observed by observation of an optical microscope. A case where the fine particles have been aggregated in the in-plane direction is shown by "○" and a case where the fine particles are not aggregated or have been aggregated in three-dimensionally is shown by "×". Surface photographs of the anti-glare films of References 1 and 31 among References 1 to 39 are representatively shown in FIGS. 7 and 8.

(Creation of Meniscuses)

The surface shape is observed by applying a differential interference by the optical microscope and whether a portion between cells is flat or inclined is observed, or a confocal image is fetched, the surface is observed, and whether the portion between the cells is flat or inclined is observed by a laser microscope (manufactured by Lasertec Co., Ltd.).

TABLE 3

| | ANTI-GLARE LAYER | | | | | |
|---|---|---|---|---|---|---|
| | FINE PARTICLES | | | SOLVENT | | DIFFERENCE BETWEEN SURFACE ENERGY AND SURFACE TENSION [mN/m] |
| | TYPE/CONTENT | SURFACE ENERGY [mN/m] | MEAN DIAMETER [μM] | TYPE | SURFACE TENSION [mN/m] | |
| REFERENCE 1 | STYRENE 100 MASS % | 33 | 6 | TERTIARY BUTANOL | 20.0 | 13.0 |
| REFERENCE 2 | STYRENE 100 MASS % | 33 | 6 | TERTIARY BUTANOL | 20.0 | 13.0 |
| REFERENCE 3 | STYRENE 100 MASS % | 33 | 6 | TERTIARY BUTANOL | 20.0 | 13.0 |
| REFERENCE 4 | STYRENE 100 MASS % | 33 | 6 | TERTIARY BUTANOL | 20.0 | 13.0 |
| REFERENCE 5 | STYRENE 100 MASS % | 33 | 6 | TERTIARY BUTANOL | 20.0 | 13.0 |
| REFERENCE 6 | STYRENE 100 MASS % | 33 | 6 | ISOPROPYL ACETATE | 22.1 | 10.9 |
| REFERENCE 7 | STYRENE 100 MASS % | 33 | 6 | TERTIARY BOTANOL | 20.0 | 13.0 |
| REFERENCE 8 | STYRENE 90 MASS % ACRYL 10 MASS % | — | 6 | TOLUENE | 27.9 | — |
| REFERENCE 9 | STYRENE 70 MASS % ACRYL 30 MASS % | — | 6 | NEK | 24.5 | — |
| REFERENCE 10 | STYRENE 70 MASS % ACRYL 30 MASS % | — | 6 | BUTYLE ACETATE | 24.8 | — |
| REFERENCE 11 | STYRENE 70 MASS % ACRYL 30 MASS % | — | 6 | MIBX | 25.4 | — |
| REFERENCE 12 | STYRENE 70 MASS % ACRYL 30 MASS % | — | 6 | TOLUENE | 27.9 | — |
| REFERENCE 13 | STYRENE 70 MASS % ACRYL 30 MASS % | — | 6 | DIMETHYL CARBONATE | — | — |
| REFERENCE 14 | STYRENE 70 MASS % ACRYL 30 MASS % | — | 6 | TOLUENE 40 MASS %/DIMETHYL CARBONATE 60 MASS % | — | — |
| REFERENCE 15 | STYRENE 70 MASS % ACRYL 30 MASS % | — | 6 | TOLUENE 60 MASS %/DIMETHYL CARBONATE 40 MASS % | — | — |
| REFERENCE 16 | STYRENE 70 MASS % ACRYL 30 MASS % | — | 6 | TOLUENE 80 MASS %/NEK 20 MASS % | — | — |
| REFERENCE 17 | STYRENE 70 MASS % ACRYL 30 MASS % | — | 6 | BUTYLE ACETATE 60 MASS %/DIMETHYL CARBONATE 40 MASS % | — | — |
| REFERENCE 18 | STYRENE 70 MASS % ACRYL 30 MASS % | — | 6 | MIBK 60 MASS %/DIMETHYL CARBONATE 40 MASS % | — | — |
| REFERENCE 19 | STYRENE 60 MASS % ACRYL 40 MASS % | — | 6 | MIBK | 25.4 | — |
| REFERENCE 20 | STYRENE 60 MASS % ACRYL 40 MASS % | — | 6 | TOLUENE | 27.9 | — |
| REFERENCE 21 | STYRENE 100 MASS % | 33 | 6 | TERTIARY BUTANOL | 20.0 | 13.0 |
| REFERENCE 22 | STYRENE 100 MASS % | 33 | 6 | TERTIARY BUTANOL | 20.0 | 13.0 |
| REFERENCE 23 | STYRENE 100 MASS % | 33 | 6 | TERTIARY BUTANOL | 20.0 | 13.0 |
| REFERENCE 24 | STYRENE 100 MASS % | 33 | 4 | TERTIARY BUTANOL | 20.0 | 13.0 |
| REFERENCE 25 | STYRENE 100 MASS % | 33 | 8 | TERTIARY BUTANOL | 20.0 | 13.0 |
| REFERENCE 26 | STYRENE 100 MASS % | 33 | 10 | TERTIARY BUTANOL | 20.0 | 13.0 |

| | ANTI-GLARE LAYER | | | | | OPTICAL CHARACTERISTICS | | | AGGREGATION IN IN-PLANE DIRECTION | CREATION OF MENISCUSES |
|---|---|---|---|---|---|---|---|---|---|---|
| | RESIN DRY CURING | FILLING RATE OF FINE PARTICLES [%] | AVERAGE FILM THICKNESS AFTER DRYING [μm] | TRANSPARENT RESIN LAYER RESIN DRY CURING | SURFACE ROUGHNESS R Δc [μM] | ANTI-GLARE PROPERTY | DEGREE OF WHITE MUDDINESS A | DEGREE OF WHITE MUDDINESS B | | |
| REFERENCE 1 | X | 5 | 6 | — | 0.032 | ○ | 1.1 | 0.7 | ○ | ○ |
| REFERENCE 2 | X | 5 | 8 | — | 0.022 | ○ | 1.0 | 0.6 | ○ | ○ |
| REFERENCE 3 | X | 5 | 12 | — | 0.02 | ○ | 1.0 | 0.6 | ○ | ○ |
| REFERENCE 4 | X | 5 | 15 | — | 0.018 | ○ | 1.1 | 0.7 | ○ | ○ |
| REFERENCE 5 | X | 5 | 18 | — | 0.015 | ○ | 1.1 | 0.7 | ○ | ○ |
| REFERENCE 6 | X | 5 | 6 | — | 0.035 | ○ | 1.2 | 0.9 | ○ | ○ |
| REFERENCE 7 | X | 5 | 6 | ○ | 0.013 | ○ | 0.8 | 0.4 | ○ | ○ |
| REFERENCE 8 | X | 5 | 6 | — | 0.035 | ○ | 1.2 | 0.9 | ○ | ○ |
| REFERENCE 9 | X | 5 | 6 | — | 0.038 | ○ | 1.1 | 0.7 | ○ | ○ |
| REFERENCE 10 | X | 5 | 6 | — | 0.038 | ○ | 1.1 | 0.7 | ○ | ○ |
| REFERENCE 11 | X | 5 | 6 | — | 0.035 | ○ | 1.0 | 0.6 | ○ | ○ |
| REFERENCE 12 | X | 5 | 6 | — | 0.038 | ○ | 1.1 | 0.7 | ○ | ○ |
| REFERENCE 13 | X | 5 | 6 | — | 0.036 | ○ | 1.2 | 0.9 | ○ | ○ |
| REFERENCE 14 | X | 5 | 6 | — | 0.036 | ○ | 1.1 | 0.7 | ○ | ○ |

TABLE 3-continued

| | | | | | | | | | | |
|---|---|---|---|---|---|---|---|---|---|---|
| REFERENCE 15 | X | 5 | 6 | — | 0.039 | ○ | 1.0 | 0.6 | ○ | ○ |
| REFERENCE 16 | X | 5 | 6 | — | 0.04 | ○ | 1.0 | 0.6 | ○ | ○ |
| REFERENCE 17 | X | 5 | 6 | — | 0.039 | ○ | 1.1 | 0.7 | ○ | ○ |
| REFERENCE 18 | X | 5 | 6 | — | 0.037 | ○ | 1.1 | 0.7 | ○ | ○ |
| REFERENCE 19 | X | 5 | 6 | — | 0.028 | ○ | 0.9 | 0.5 | ○ | ○ |
| REFERENCE 20 | X | 5 | 6 | — | 0.029 | ○ | 0.9 | 0.5 | ○ | ○ |
| REFERENCE 21 | X | 4 | 6 | — | 0.015 | ○ | 0.9 | 0.5 | ○ | ○ |
| REFERENCE 22 | X | 10 | 6 | — | 0.042 | ◎ | 1.4 | 1.1 | ○ | ○ |
| REFERENCE 23 | X | 15 | 6 | — | 0.045 | ◎ | 1.6 | 1.3 | ○ | ○ |
| REFERENCE 24 | X | 5 | 4 | — | 0.035 | ○ | 1.0 | 0.6 | ○ | ○ |
| REFERENCE 25 | X | 5 | 8 | — | 0.037 | ○ | 1.1 | 0.7 | ○ | ○ |
| REFERENCE 26 | X | 5 | 10 | — | 0.036 | ○ | 1.1 | 0.7 | ○ | ○ |

TABLE 4

| | ANTI-GLARE LAYER | | | | | | |
|---|---|---|---|---|---|---|---|
| | FINE PARTICLES | | | SOLVENT | | | |
| | TYPE/CONTENT | SURFACE ENERGY [mN/m] | MEAN DIAMETER [μM] | TYPE | SURFACE TENSION [mN/m] | DIFFERENCE BETWEEN SURFACE ENERGY AND SURFACE TENSION [mN/m] | RESIN DRY CURING |
| REFERENCE 27 | STYRENE 100 MASS % | 33 | 6 | TERTIARY BUTANOL | 20.0 | 13.0 | X |
| REFERENCE 28 | STYRENE 100 MASS % | 33 | 6 | TERTIARY BUTANOL | 20.0 | 13.0 | X |
| REFERENCE 29 | STYRENE 100 MASS % | 33 | 6 | TERTIARY BUTANOL | 20.0 | 13.0 | X |
| REFERENCE 30 | STYRENE 100 MASS % | 33 | 6 | MIBK | 25.4 | 7.6 | X |
| REFERENCE 31 | STYRENE 100 MASS % | 33 | 6 | TOLUENE | 27.9 | 5.1 | X |
| REFERENCE 32 | ACRYL 100 MASS % | 40 | 6 | TERTIARY BUTANOL | 20.0 | 20.0 | X |
| REFERENCE 33 | ACRYL 100 MASS % | 40 | 6 | MIBK | 25.4 | 14.6 | X |
| REFERENCE 34 | STYRENE 25 MASS % ACRYL 75 MASS % | — | 6 | TOLUENE | 27.9 | — | X |
| REFERENCE 35 | STYRENE 45 MASS % ACRYL 55 MASS % | — | 6 | TOLUENE | 27.9 | — | X |
| REFERENCE 36 | ACRYL 100 MASS % | 40 | 6 | TERTIARY BUTANOL | 20.0 | 20.0 | X |
| REFERENCE 37 | ACRYL 100 MASS % | 40 | 6 | TERTIARY BUTANOL | 20.0 | 20.0 | X |
| REFERENCE 38 | STYRENE 100 MASS % | 33 | 6 | TERTIARY BUTANOL | 20.0 | 13.0 | ○ |
| REFERENCE 39 | STYRENE 100 MASS % | 33 | 6 | TERTIARY BUTANOL | 20.0 | 13.0 | X |

| | ANTI-GLARE LAYER | | | | | | | | |
|---|---|---|---|---|---|---|---|---|---|
| | FILLING RATE OF FINE PARTICLES [%] | AVERAGE FILM THICKNESS AFTER DRYING [μm] | TRANSPARENT RESIN LAYER RESIN DRY CURING | SURFACE ROUGHNESS R Δc [μM] | ANTI-GLARE PROPERTY | DEGREE OF WHITE MUDDINESS A | DEGREE OF WHITE MUDDINESS B | AGGREGATION IN IN-PLANE DIRECTION | CREATION OF MENISCUSES |
| REFERENCE 27 | 5 | 4 | — | 0.09 | ◎ | 2.9 | 2.7 | ○ | ○ |
| REFERENCE 28 | 3 | 6 | — | 0.002 | X | 0.8 | 0.4 | ○ | X |
| REFERENCE 29 | 5 | 5 | — | 0.07 | ◎ | 2.3 | 2.1 | ○ | ○ |
| REFERENCE 30 | 5 | 6 | — | 0.1 | ◎ | 3.1 | 7.9 | X | ○ |
| REFERENCE 31 | 5 | 6 | — | 0.15 | ◎ | 3.5 | 3.4 | X | ○ |
| REFERENCE 32 | 5 | 6 | — | 0.002 | X | 0.6 | 0.4 | X | ○ |
| REFERENCE 33 | 5 | 6 | — | 0.002 | X | 0.6 | 0.2 | X | ○ |
| REFERENCE 34 | 5 | 6 | — | 0.002 | X | 0.6 | 0.2 | X | ○ |
| REFERENCE 35 | 5 | 6 | — | 0.001 | X | 0.6 | 0.2 | X | ○ |
| REFERENCE 36 | 5 | 4 | — | 0.002 | X | 0.7 | 0.3 | X | ○ |
| REFERENCE 37 | 20 | 4 | — | 0.08 | ◎ | 2.5 | 2.3 | X | ○ |
| REFERENCE 38 | 5 | 6 | — | 0.002 | X | 0.8 | 0.4 | ○ | X |
| REFERENCE 39 | 5 | 6 | X | 0.001 | X | 0.6 | 0.4 | ○ | X |

In Tables 3 and 4, degrees A and B of white muddiness indicate the degrees of white muddiness measured as follows.

Degree A of White Muddiness:

The degree of white muddiness measured after the black glass was adhered onto the back surface of the anti-glare film.

Degree B of White Muddiness:

The degree of white muddiness measured after the black acrylic sheet was adhered onto the back surface of the anti-glare film.

In Tables 3 and 4, "x" in the dry curing of the resin indicates the coating film which is liquid without being cured after the drying step, "○" indicates the coating film which has been cured after the drying step, and "–" indicates the coating film which does not have the transparent resin layer.

In Tables 3 and 4, a filling rate is a rate (B/A×100) between a content B of the fine particles to a content A of the resin contained in the anti-glare property.

Each numerical value in References 1 to 39 is obtained as follows.

(Average Film Thickness of Anti-Glare Layer)

The average film thickness of the anti-glare layer is measured by using a Contact type Thickness Measuring Instrument (manufactured by TESA Co., Ltd.).

(Mean Diameter of Fine Particles)

The mean diameter of the fine particles is obtained by measuring the particle sizes by the colter multisizer and averaging obtained data.

(Surface Tension of Solvent)

The surface tension of the solvent is calculated by, for example, the wilhelmy method whereby the wilhelmy sheet and the liquid sample are come into contact with each other, a distortion is applied, and a force adapted to pull the wilhelmy sheet into the liquid is measured. As a measuring apparatus, Rheo-Surf as a dynamic surface tension measuring apparatus manufactured by UBM Co., Ltd. is used. The measurement is performed after a liquid temperature of the solvent and a room temperature were set to be constant. Specifically speaking, the solvent is left under an environment of the room temperature of 25° C. and at a point of time when the liquid temperature of the solvent is equal to 25° C., the liquid temperature of the solvent is measured.

(Surface Energy of Fine Particles)

The fine particles are densely pressed by a pressing machine into a sheet shape and, thereafter, various kinds of liquids are dropped onto its surface, a critical surface tension is calculated, and its calculation value is used as a surface energy of the fine particles. The measurement is performed under an environment of 25° C. in a manner similar to the measurement of the surface tension of the foregoing solvent.

The following points will be understood from Tables 3 and 4.

In the anti-glare films of References 1 to 7 and 21 to 26 in which styrene is used as fine particles of the anti-glare layer and the solvent whose surface tension is equal to or less than 23 mN/m is used and the anti-glare films of References 8 to 20 in which an acryl (10 mass %)-styrene (90 mass %) copolymer, an acryl (30 mass %)-styrene (70 mass %) copolymer, or an acryl (40 mass %)-styrene (60 mass %) copolymer is used, the root mean square slope R$\Delta$q lies within a range from 0.003 to 0.05 and both of the anti-glare property and the degree of white muddiness are good. In the case where the dry film thickness is smaller than the mean diameter of the fine particles in a manner similar to References 27 and 29 or in the case where the fine particles surface energy is relatively smaller than the solvent surface tension in a manner similar to References 30 and 31, the value of R$\Delta$q increases. Although the excellent anti-glare property is obtained, the degree of white muddiness is large and the contrast decreases. On the other hand, in the case where the fine particles surface energy is relatively larger than the solvent surface tension in a manner similar to References 32 to 36, the value of R$\Delta$q decreases. Although the degree of white muddiness is small, the anti-glare property is poor. If the addition amount of the fine particles is increased and the dried film thickness is set to be less than the mean diameter of the fine particles as performed in Reference 37, although the anti-glare property appears, the anti-glare film having the large white muddiness similar to the conventional film is obtained. On the other hand, in Reference 38 using the resin which is dried and cured, the value of R$\Delta$q decreases and although the degree of white muddiness is small, the anti-glare property is poor. It will be understood from Reference 28 that when the addition amount of the fine particles is equal to 3 mass %, the number of flat portions increases and although the white muddiness is small, the anti-glare property does not appear. Therefore, it is preferable that the addition amount of the fine particles is equal to 4 mass % or more as shown in References 21 to 23.

In the case where styrene fine particles whose surface energy is equal to 33 mN/m and acrylic fine particles whose surface energy is equal to 40 mN/m are used, a difference between the surface energy of the fine particles and the surface tension of the solvent is small. As shown in Reference 30, if the difference between the surface energy of the fine particles and the surface tension of the solvent is less than 8 mN/m, the fine particles are vigorously and three-dimensionally aggregated upon drying, the surface having the large concave/convex portions is obtained, and a glossy film having the high anti-glare and the low contrast is obtained.

When such a difference increases and the difference between the surface energy of the fine particles and the solvent surface tension lies within a range from 8 to 13 mN/m as shown in References 1 and 6, even after the drying, Benard cells begin to be formed by the fine particles arranged in a plane shape. A gentle waviness is formed and a film having the low anti-glare and the high contrast can be manufactured.

When the difference further increases and the difference between the surface energy of the fine particles and the solvent surface tension exceeds 13 mN/m as shown in References 32 and 36, the Benard cells are hard to be formed onto the surface after the drying and a film having a number of flat portions and the low anti-glare property is obtained. In order to allow the anti-glare property to appear in the above relation, the surface has to be coated thinner than the particle sizes. In addition, in order to eliminate the flat portions, a number of fine particles have to be also added. Therefore, a film having the large white muddiness and the low contrast is obtained.

From the above results, by properly selecting the relation between the surface energy of the fine particles and the surface tension of the solvent and by using the resin which is not cured after the drying, a desired roughness can be realized by controlling the creation of the Benard cells on the anti-glare layer surface. An anti-glare film in which the degree of white muddiness is suppressed while keeping the anti-glare property can be obtained.

It has been found from Reference 7 that the degree of white muddiness can be further reduced by providing the transparent resin layer containing the dry curing resin. In Reference 39 in which the resin which is not dried and cured is used for the transparent resin layer, R$\Delta$q decreases and the anti-glare property deteriorates. Therefore, by providing the transparent resin layer by using the resin which is dried and cured, an anti-glare film whose contrast is superior to that of the anti-glare film which does not have the transparent resin layer while maintaining the anti-glare property can be obtained.

<References 40 to 44>

Anti-glare films are obtained in a manner similar to References 1 to 5 except that the addition amount of the styrene fine particles is changed to 400 g.

<References 45 to 48>

Anti-glare films are obtained in a manner similar to References 1 to 5 except that the addition amount of the styrene fine particles is changed to 480 g.

(Anti-Glare Property)

With respect to the anti-glare films of References 1 to 5 and 40 to 48 obtained as mentioned above, the anti-glare properties are evaluated as follows.

Two fluorescent lamps are reflected onto the anti-glare layer surface and the visibility of the fluorescent lamps is evaluated by the following five levels.

Level 5: The fluorescent lamps cannot be seen as two separate lamps and their shapes cannot be discriminated either.

Level 4: Although the fluorescent lamps can be visually perceived as two lamps, their shapes cannot be discriminated.

Level 3: The fluorescent lamps are seen as two separate lamps, their outlines are dimly seen, and the shapes of the fluorescent lamps can be discriminated.

Level 2: The fluorescent lamps are clearly seen as two separate lamps and their outlines are seen.

Level 1: The fluorescent lamps are clearly seen as two separate lamps and their outlines can be linearly, clearly, and visually perceived.

TABLE 5

| | FILING RATE OF PARTICLES | COATING THICKNESS | LEVEL VALUE OF ANTI-GLARE PROPERTY |
|---|---|---|---|
| REFERENCE 1 | 5% | 6 μm | 5 |
| REFERENCE 2 | 5% | 8 μm | 4 |
| REFERENCE 3 | 5% | 12 μm | 3 |
| REFERENCE 4 | 5% | 15 μm | 3 |
| REFERENCE 5 | 5% | 18 μm | 2 |
| REFERENCE 40 | 10% | 6 μm | 5 |
| REFERENCE 41 | 10% | 8 μm | 4 |
| REFERENCE 42 | 10% | 12 μm | 4 |
| REFERENCE 43 | 10% | 15 μm | 3 |
| REFERENCE 44 | 10% | 18 μm | 3 |
| REFERENCE 45 | 12% | 6 μm | 5 |
| REFERENCE 46 | 12% | 8 μm | 4 |
| REFERENCE 47 | 12% | 12 μm | 4 |
| REFERENCE 48 | 12% | 15 μm | 5 |

It will be understood from Table 5 that there is such a tendency that when the filling rate exceeds 10%, an anti-glare degree dependency due to the coating thickness decreases and control of the anti-glare property due to adjustment of the coating thickness becomes difficult.

Subsequently, a correlation between the degree of white muddiness at the time when the black glass is adhered and the degree of white muddiness is measured and the degree of white muddiness at the time when the black acrylic sheet is adhered and the degree of white muddiness is measured will be described with reference to Table 6 and FIG. 9.

TABLE 6

| | DEGREE OF WHITE MUDDINESS (MESUREMENT VALUE) IN GLASS SHEET | DEGREE OF WHITE MUDDINESS (MESUREMENT VALUE) IN ACRYLIC SHEET | DEGREE OF WHITE MUDDINESS (CALCULATION VALUE) IN ACRYLIC SHEET |
|---|---|---|---|
| REFERENCE 51 | 2.6 | 2.3 | 2.3 |
| REFERENCE 52 | 2.0 | 1.8 | 1.7 |
| REFERENCE 53 | 0.9 | 0.5 | 0.5 |
| REFERENCE 54 | 0.9 | 0.6 | 0.5 |
| REFERENCE 55 | 1.0 | 0.6 | 0.6 |
| REFERENCE 56 | 1.0 | 0.6 | 0.6 |
| REFERENCE 57 | 1.7 | 1.5 | 1.4 |
| REFERENCE 58 | 1.2 | 0.8 | 0.9 |
| REFERENCE 59 | 1.3 | 0.9 | 1.0 |
| REFERENCE 60 | 1.1 | 0.7 | 0.7 |
| REFERENCE 61 | 1.2 | 0.8 | 0.8 |
| REFERENCE 62 | 1.0 | 0.6 | 0.6 |
| REFERENCE 63 | 1.0 | 0.6 | 0.6 |
| REFERENCE 64 | 0.9 | 0.4 | 0.5 |

Table 6 shows measurement results of the degree of white muddiness measured by respectively adhering the black glass and the black acrylic sheet with respect to the anti-glare films in References 51 to 64 obtained by controlling the degrees of white muddiness by properly adjusting the film thickness and the particle size in Reference 1. On the other hand, values obtained by calculating the degrees of white muddiness in the acrylic sheet by using a regression straight line obtained by those correlations are shown in Table 6. It will be understood from Table 6 that values near the measurement values can be obtained by the calculations.

Figure 9:
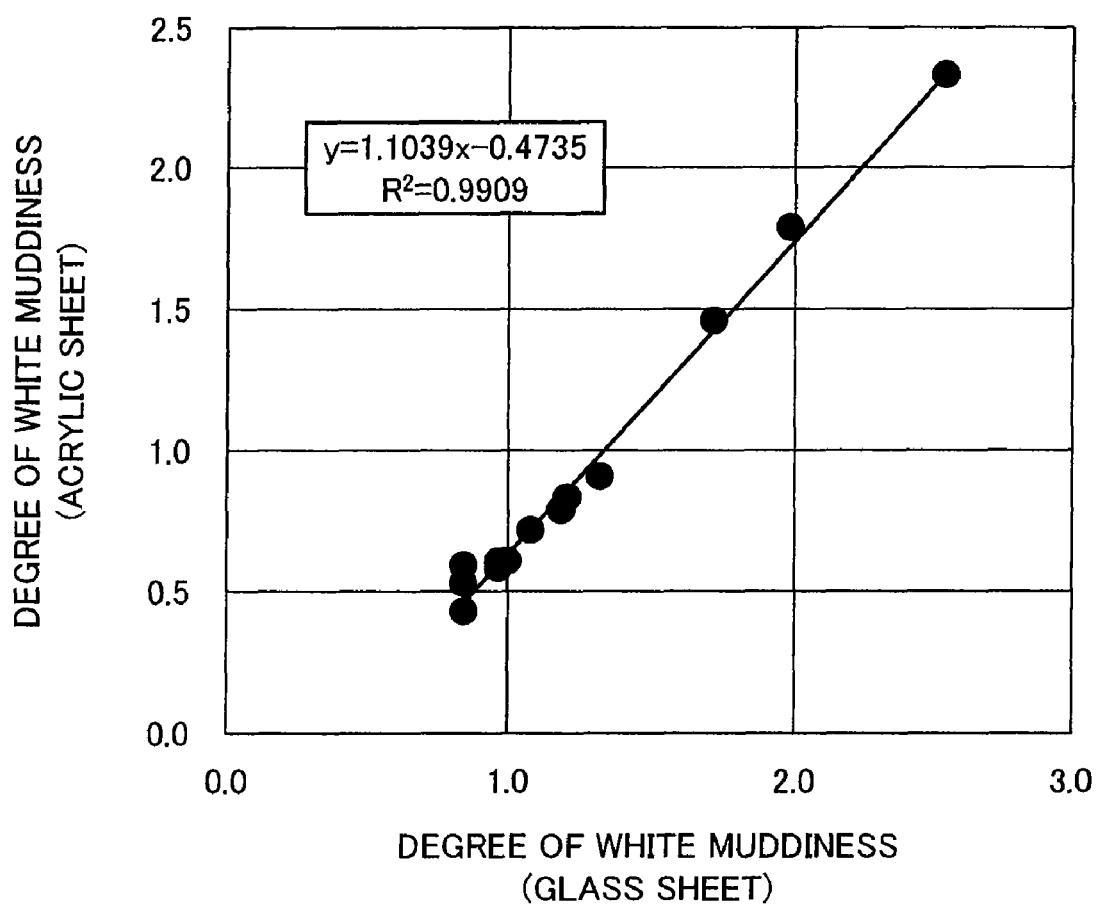
FIG. 9 is a graph for explaining a correlation between a degree of white muddiness when it is measured by using black glass and a degree of white muddiness when it is measured by using a black acrylic sheet.
Figure 10:
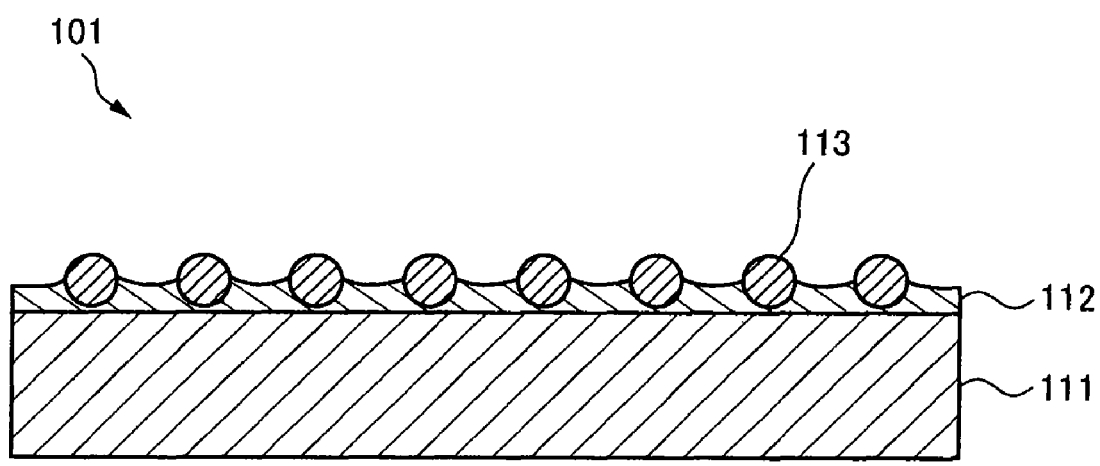
FIG. 10 is a schematic cross sectional view showing an example of a construction of a conventional anti-glare film.
Figure 11:
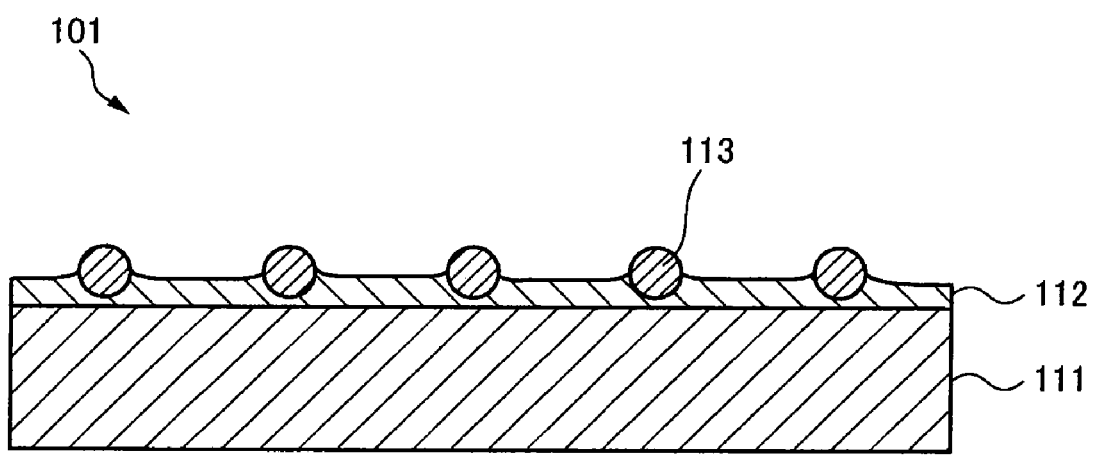
FIG. 11 is a schematic cross sectional view showing an example of a construction of a conventional anti-glare film.

The regression straight line which is obtained by the correlation between the black glass and the black acrylic sheet is obtained in the case where the degree of white muddiness at the time when the black glass sheet has been adhered is plotted to an axis of abscissa and the degree of white muddiness at the time when the black acrylic sheet has been adhered is plotted to an axis of ordinate as shown in FIG. 9. From FIG. 9, assuming that the degree of white muddiness at the time when the glass sheet has been adhered is set to x and the degree of white muddiness at the time when the acrylic sheet has been adhered is set to y, the regression straight line of $$y = 1.1039x - 0.4735$$

is obtained and a decision coefficient $R^2$ is equal to 0.9909. Consequently, it will be understood that there is a large correlation between the degree of white muddiness measured by using the black glass sheet and the degree of white muddiness measured by using the black acrylic sheet.

The numerical values mentioned in the foregoing embodiments and Examples are only examples and numerical values different from them may be used as necessary.

Although the above first embodiment has been described with respect to the case of applying the anti-glare film to the liquid crystal display apparatus, the applying example of the anti-glare film is not limited to it. For example, the invention can be applied to various display apparatuses such as plasma display, electroluminescence display, and CRT (Cathode Ray Tube) display.

On the other hand, although the above second embodiment has been described with respect to the anti-glare film in which the transparent resin layer is formed onto the anti-glare layer having a thickness similar to that of the anti-glare layer of the first embodiment, for example, a thickness of a combination of the anti-glare layer and the transparent resin layer may be set to be equal to the thickness of anti-glare layer 12 in the foregoing first embodiment.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An anti-glare film comprising:
a substrate; and
an anti-glare layer which is formed on said substrate and contains fine particles,
wherein said anti-glare layer has micro concave/convex shapes on its surface,
the micro concave/convex shapes are formed by coating said substrate with a coating material containing said fine particles and aggregating said fine particles by a convection of said coating material,
a thickness of said anti-glare layer is equal to or larger than a mean diameter of said fine particles and is equal to or less than three times as large as the mean diameter of said fine particles, and
said fine particles are constructed substantially by fine particles having particle sizes less than twice as large as the thickness of said anti-glare layer; and
wherein a fluctuation coefficient of particle size distribution of said fine particles is equal to or larger than 25% and is equal to or less than 40%.

2. The anti-glare film according to claim 1, wherein a layer having a translucent property of at least one layer is laminated onto said anti-glare layer.

3. The anti-glare film according to claim 1, wherein
said fine particles comprise by two or more kinds of fine particles having different particle size distribution, and
said fine particles consist substantially of fine particles having particle sizes less than 1.6 times as large as a mean diameter of the fine particles whose mean diameter is largest, and the thickness of said anti-glare layer is equal to or larger than 0.8 time as large as the mean diameter of said fine particles whose mean diameter is largest and is equal to or less than three times as large as the mean diameter of said fine particles whose mean diameter is largest.

4. The anti-glare film according to claim 1, wherein said fine particles contain at least one kind of polystyrene, polymethyl methacrylate, their copolymer, melamine, and silica.

5. The anti-glare film according to claim 1, wherein an outer haze is equal to 5% or less.

6. The anti-glare film according to claim 1, wherein said fine particles are covered with said resin and said fine particles are not projected from said anti-glare layer surface.

7. A display apparatus comprising:
a display unit for displaying an image; and
an anti-glare film formed on a display surface side of said display unit,
wherein said anti-glare film has
a substrate and
an anti-glare layer which is formed on said substrate and contains fine particles,
said anti-glare layer has micro concave/convex shapes on its surface,
the micro concave/convex shapes of said anti-glare layer are formed by coating said substrate with a coating material containing said fine particles and aggregating said fine particles by a convection of said coating material,
a thickness of said anti-glare layer is equal to or larger than a mean diameter of said fine particles and is equal to or less than three times as large as the mean diameter of said fine particles, and
said fine particles are constructed substantially by fine particles having particle sizes less than twice as large as the thickness of said anti-glare layer; and
wherein a fluctuation coefficient of particle size distribution of said fine particles is equal to or larger than 25% and is equal to or less than 40%.

* * * * *